United States Patent
Miyamoto et al.

(10) Patent No.: US 7,110,648 B2
(45) Date of Patent: Sep. 19, 2006

(54) ANALOG OPTICAL TRANSMISSION SYSTEM

(75) Inventors: Toshiyuki Miyamoto, Yokohama (JP); Tetsufumi Tsuzaki, Yokohama (JP); Tatsuhiko Shitomi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/211,097

(22) Filed: Aug. 25, 2005

(65) Prior Publication Data
US 2006/0045534 A1    Mar. 2, 2006

Related U.S. Application Data

(60) Provisional application No. 60/628,137, filed on Nov. 17, 2004.

(30) Foreign Application Priority Data
Aug. 27, 2004   (JP)   ............................ P2004-248977

(51) Int. Cl.
*G02B 6/02* (2006.01)
*H04J 14/02* (2006.01)
*H01S 3/00* (2006.01)

(52) U.S. Cl. .................. 385/123; 385/24; 385/124; 385/141; 398/81; 398/148; 359/333; 359/334; 359/341.1

(58) Field of Classification Search ................ 385/123, 385/124, 126, 127, 128, 141, 122, 24; 398/81, 398/148; 359/333, 334, 341.1
See application file for complete search history.

(56) References Cited

U.S. PATENT DOCUMENTS 5,680,491 A    10/1997   Shigematsu et al. .......... 385/24
6,965,470 B1*  11/2005   So ........................ 359/341.41
2003/0081308 A1*  5/2003   So ............................ 359/337
2004/0042799 A1*  3/2004   Sardesai et al. ............ 398/141
2004/0170437 A1*  9/2004   Hasegawa et al. .......... 398/148
2004/0234219 A1* 11/2004   Aikawa et al. ............. 385/127
2006/0045534 A1*  3/2006   Miyamoto et al. .......... 398/148

FOREIGN PATENT DOCUMENTS

| EP | 1 376 905 A2 | 1/2004 | ............. 385/123 X |
| JP | 4-260007 | 9/1992 | ............. 385/123 X |
| JP | 7-135493 | 5/1995 | ............. 385/123 X |
| JP | 2001-144354 A | 5/2001 | ............. 385/123 X |
| JP | 2003-152646 A | 5/2003 | ............. 385/123 X |

\* cited by examiner

*Primary Examiner*—Brian M. Healy
(74) *Attorney, Agent, or Firm*—McDermott Will & Emery LLP

(57) ABSTRACT

The present invention relates to an analog optical transmission system having a construction for expanding an analog transmittable distance. The analog optical transmission system includes: a light transmitter outputting analog optical signals such as image signals modulated in accordance with electrical signals multiplexed on a frequency domain; a transmission line including a SMF of 20 km or less in the total length; and a light receiver. A dispersion compensating fiber compensating for the chromatic dispersion of the transmission line is arranged on the transmission line, and the dispersion compensating fiber satisfies one of the first condition that the chromatic dispersion is set at −250 ps/nm/km or less and a length is set at 1.1 km or less, and the condition that the chromatic dispersion is set at −330 ps/nm/km or less and a length is set at 1.2 km or less. Optical suppressing devices reducing the MPI noise are arranged at the end portion of the dispersion compensating fiber.

26 Claims, 24 Drawing Sheets

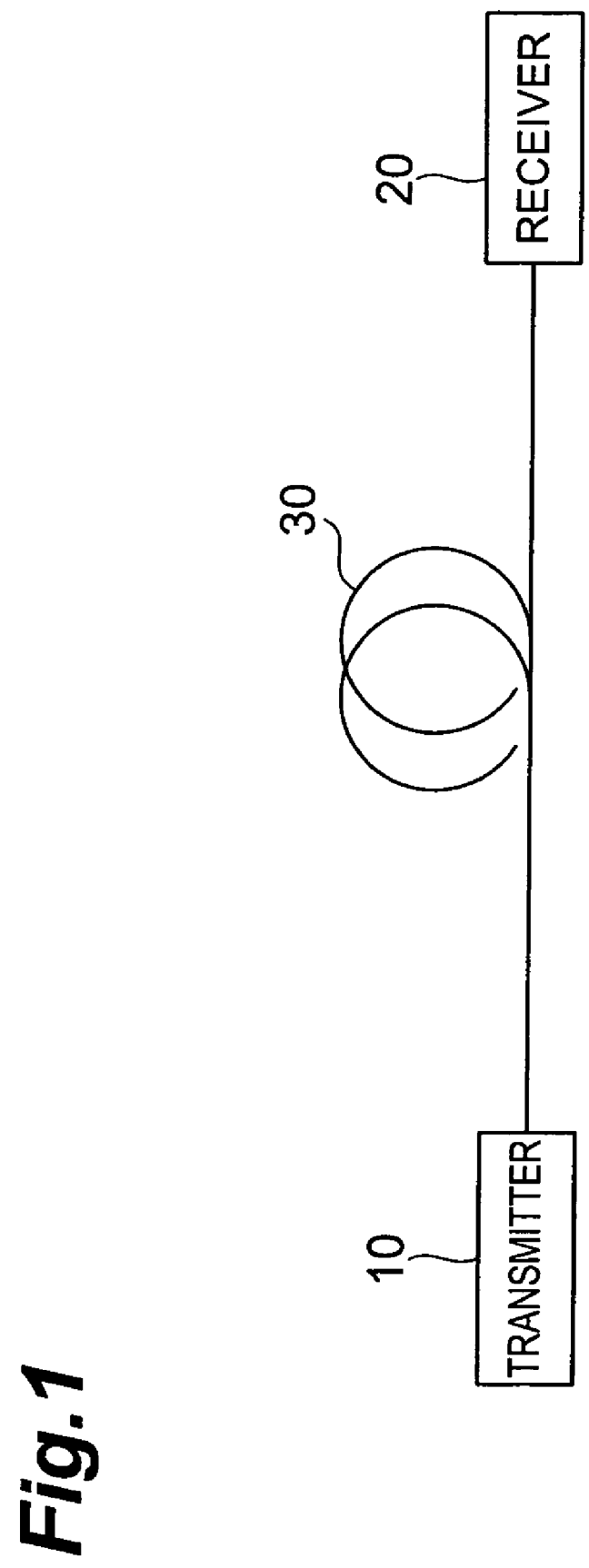

Fig.5

| | FIBER LOSS (dB/km) | CHROMATIC DISPERSION (ps/nm/km) | RAYLEIGH SCATTERING COEFFICIENT (1/m) |
|---|---|---|---|
| DCF-A (NORMAL) | 0.6 | −80 | $9.0 \times 10^{-7}$ |
| DCF-B (LARGE ABSOLUTE VALUE OF CHROMATIC DISPERSION) | 0.9 | −330 | $9.0 \times 10^{-7}$ |

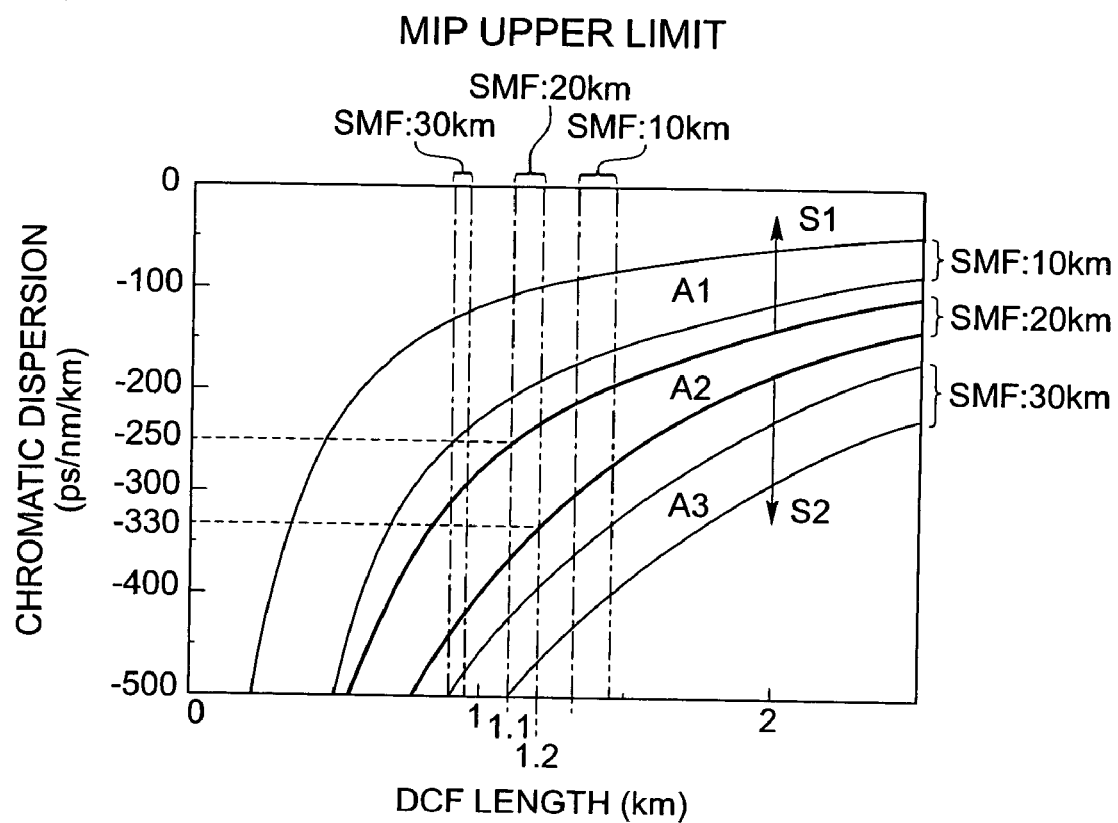

|  | DCF-C | DCF-D |
|---|---|---|
| FIBER LENGTH L (km) | 1.58 | 3.09 |
| FIBER LENGTH L (km) | 0.91 | 0.65 |
| FIBER LENGTH L (km) | 2.0 | 2.9 |
| CHROMATIC DISPERSION (ps/nm/km) | -297.4 | -149.7 |
| DISPERSION N SLOPE S (ps/nm/km$^2$) | -0.114 | -0.474 |
| LENGTH FOR SMF DISPERSION COMPENSATION | 28.5 | 28.0 |
| COEFFICIENT OF RAYLEIGH SCATTERING | $4.7 \times 10^{-7}$ | $4.2 \times 10^{-7}$ |

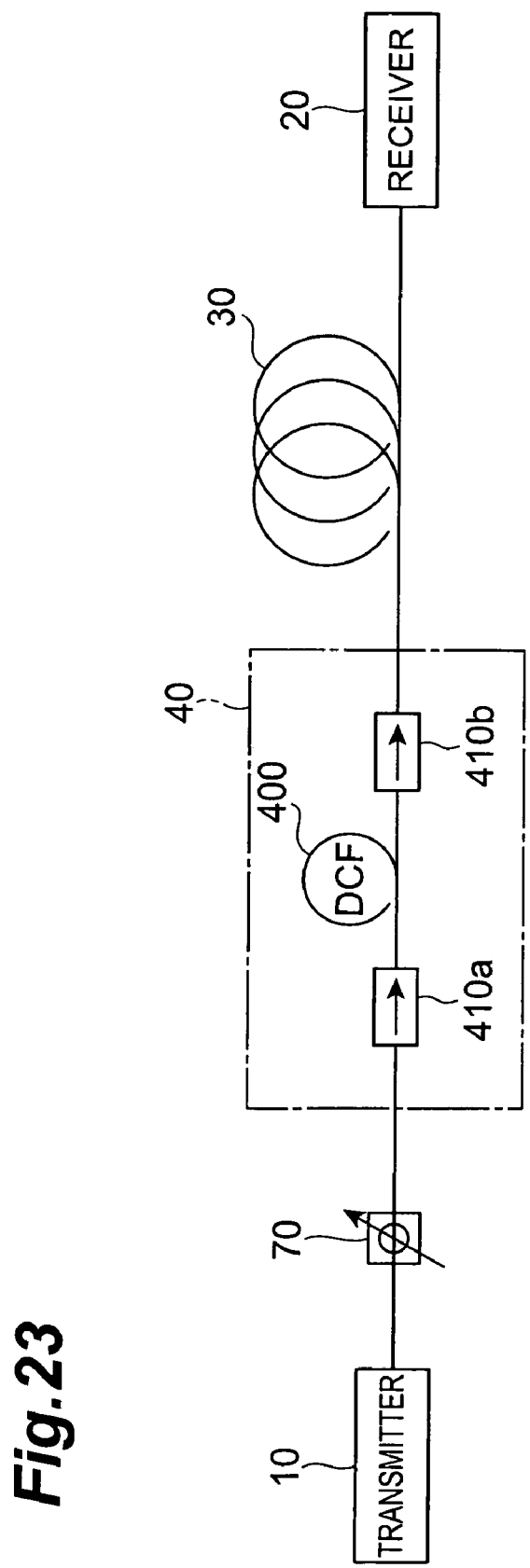

ANALOG OPTICAL TRANSMISSION SYSTEM

CROSS-REFERENCE TO RELATED APPLICATION

This application claims priority of Provisional Application 60/628,137 filed on Nov. 17, 2004 by the same Applicant, which is hereby incorporated by reference in its entirety.

BACKGROUND OF THE INVENTION

1. Field of the Invention

The present invention relates to an analog optical transmission system adapted to broadband communication, more specifically, FTTH (Fiber To The Home) service, that enables multiplication of digital data signals used in data communication service such as internet and analog signals used for broadcasting service.

2. Related Background Art

In recent years, users for the broadband communication that multiplexes the data communication service such as internet and electric mail, video broadcasting service, and so on continue to increase rapidly.

In particular, the number of users of the FTTH (Fiber To The Home) service increases remarkably, the FTTH service drawing from an end station that is the last repeating station of an existing communication network to a subscriber's home via optical fibers in a variety of broadband communication systems. The FTTH service is not only an excellent system from a point of view of communication speed, communication quality, and so on, but also excellent for a service extension such as wavelength multiplexing; thus, it is expected as a main communication system to be in charge of enlarged growth of the broadband communication. That is, the current FTTH service is only used for transmission/reception of digital data signals, while the optical fiber has the great feature that enables simultaneous transmission of wavelength multiplexing. Accordingly, it is expected to further develop to wavelength multiplying services founded on an optical fiber network currently under maintenance. In this way, it is pointed out that various services such as distributions of not only the digital signals used in the internet and the like, but also the image signals based on an analog transmission system may be achieved without great plant and equipment investments.

So far, when an analog transmission such as the CATV system is employed, there are many cases that light from a DFB laser is modulated externally, in order to enhance the transmission length, to achieve an excellent linearity and avoid the distortion by chirps by DFB laser. However, an use of such an external modulator may cause an increase of the number of components and/or an increase at manufacturing cost. On the other hand, when the DFB laser is directly modulated, a system can be achieved with low cost, but easily causes a distortion due to an FM response in the laser, and further is subject to effects of the chromatic dispersion to be occurred in the transmission line; consequently, a transmittable distance is restricted (currently, at most several kilometers).

In the aforementioned analog optical transmission system, it is necessary to reduce the effect of the chromatic dispersion by means of a dispersion compensating device arranged at a predetermined position of the transmission line. For example, patent references 1–3 disclose constitutions enabling dispersion compensation on analog transmission. Additionally, the patent reference 2 discloses an technique utilizing a dispersion compensating fiber as a dispersion compensating device to multiple branched transmission lines, which is not suitable for analog transmission.

For example, the Japanese Patent Application Laid-Open Nos. JP-A-2003-152646 (patent reference 1), JP-A-07-135493(patent reference 2), JP-A-2001-144354 (patent reference 3), JP-A-04-260007 (patent reference 4) disclose various dispersion-compensating technique in conventional analog optical transmission system, respectively.

SUMMARY OF THE INVENTION

The inventors have studied a dispersion compensating technique in conventional analog optical transmission system in detail, and as a result, have found problems as follows. Namely, a dispersion compensating device is arranged in a transmission line, a transmission loss could increase in the transmission line. In addition, in the analog optical transmission system disclosed in the aforementioned patent references 1–3, a relative intensity noise (RIN) is deteriorated under the influence of the Rayleigh scattering and multi-path interference (MPI) noises. As a result, there is a problem that an analog transmittable distance can be restricted.

In particular, as pointed out in the above-mentioned patent reference 2, since in the conventional analog optical transmission system, the transmission distance cannot be extended under the influence of multiple reflection, it is denied to apply the dispersion compensating fiber as the dispersion compensating device; thus, there is no study for attainable specific constructions so far.

In order to overcome the above-mentioned problems, it is an object of the present invention to provide an analog optical transmission system having a construction to achieve a longer analog transmittable distance by using the dispersion compensating fiber.

An analog optical transmission system according to the present invention comprises: an optical transmitter outputting analog optical signals such as video signals that are modulated in accordance with electric signals multiplexed on a frequency domain; a transmission line through which the modulated optical signals propagate; an optical receiver receiving the light that has propagated in the transmission line; a dispersion compensating fiber (hereinafter, referred to as DCF) compensating for the chromatic dispersion of the transmission line; and an optical suppressing device reducing an MPI noise.

In particular, in the analog optical transmission system according to the invention, when the transmission line has a whole length of 20 km or less and includes a single mode fiber (hereinafter, referred to as SMF), the DCF, which satisfies one of a first condition that the chromatic dispersion is set at −250 ps/nm/km or less and a length is set at 1.1 km or less, and a second condition that the chromatic dispersion is set at −330 ps/nm/km or less and a length is set at 1.2 km or less, is applied thereto. The optical suppressing device is arranged in a state adjacent to at least one of the light incidence end side and the light emission end side of the DCF, and functions to suppress the light that propagates in a reverse direction to the propagating direction of the optical signals. In addition, the DCF preferably has the Rayleigh scattering coefficient of $3.0 \times 10^{-8}$ (1/m) or more but less than $1.5 \times 10^{-7}$ (1/m) to reduce the influence on the system by the Rayleigh scattering.

In the analog optical transmission system according to the present invention, preferably, when a length required for the DCF such that MPI noise is allowable on system design is provided as $L_{MPI}$, and lower-limit and upper-limit lengths required for the DCF such that CSO is allowable on system design are respectively provided as $L_{CSO1}$ and $L_{CSO2}$, the length L of the DCF is preferably set to be longer than $L_{CSO1}$ but shorter than $L_{CSO2}$ when $L_{CSO1} < L_{MPI}$, and further is set to be longer than $L_{CSO1}$ but shorter than $L_{MPI}$ when $L_{CSO1} < L_{MPI} < L_{CSO2}$.

In addition, in the analog optical transmission system according to the present invention, the DCF of the length L may be decided by a plurality of divided fiber elements; there may be a construction such that one or more optical suppressing devices are arranged between these divided fiber elements. In this case, when a length required for the DCF such that MPI noise is allowable on system design is provided as $L_{MPI}$, and lower-limit and upper-limit lengths required for the DCF such that CSO is allowable on system design are respectively provided as $L_{CSO1}$ and $L_{CSO2}$, $L_{MPI}$ may be set to be shorter than $L_{CSO1}$, and the length L of the DCF may be set to be longer than $L_{CSO1}$ and shorter than $L_{CSO2}$. Normally, when the $L_{MPI}$ is shorter than the $L_{CSO1}$, the influence of the MPI noise may be larger; however, it becomes possible to set the MPI noise of the whole DCF within the range that is allowable on system design by the plurality of optical suppressing device that are arranged between the divided fiber elements.

Also, the analog optical transmission system according to the present invention may have a group of modules including a plurality of dispersion compensating modules standardized on the transmission line. In this case, each of these plurality of dispersion compensating modules is arranged in a state that is connected directly or indirectly on the transmission line, and has a DCF compensating for the chromatic dispersion of the transmission line, an optical suppressing devices that is arranged in a state adjacent to at least either of the light incidence end side and the light emission end side of the DCF, and that suppresses the light that propagates in a reverse direction to the propagating direction of the optical signals, and a connecting terminal, e.g., optical connectors and the like. Thus, in the analog optical transmission system in which the plurality of dispersion compensating modules are arranged on the transmission line, preferably, each dispersion compensating module of the group of modules is selected so that $\Sigma MPI_i$ is smaller than $MPI_{DCF}$ and that $\Sigma D_i$ is larger than $D_1$ but smaller than $D_2$, where MPI required for the group of modules such that MPI noise is allowable on system design is provided as $MPI_{DCF}$, lower-limit and upper-limit values of the chromatic dispersion (ps/nm) required for the group of modules such that CSO is allowable on system design are respectively provided as $D_1$ and $D_2$, and the sums of the MPI and chromatic dispersion (ps/nm) of each of the plurality of dispersion compensating modules are respectively provided as $\Sigma MPI_i$ and $\Sigma D_i$.

The analog optical transmission system according to the present invention may further comprise an optical amplifier arranged at a predetermined position on the transmission line because the transmission loss in the transmission line and DCF may be compensated.

Additionally, in order to avoid the degradation of the transmission characteristics caused by signal distortion in the optical amplifier, the optical amplifier preferably has a gain slope whose absolute value is 0 dB/nm or more but 0.2 dB/nm or less at signal light wavelength. From the same reasons, the analog optical transmission system may further have a flattening device that is arranged at a predetermined position on the transmission line and that flattens a gain shape of the rare earth doped optical fiber amplifier. Besides, the optical amplifier may be any one of the rare earth doped optical fiber amplifier, distributed Raman amplifier, lumped Raman amplifier, and semiconductor optical amplifier.

In the analog optical transmission system according to the present invention, the transmission path of the optical signal may be multiplexed to enable an analog signal simultaneous distribution to a plurality of portions. In this case, an optical branching device such as optical branching couplers is arranged on the transmission path to branch optical signals propagating from the optical transmitter to the optical receiver into a plurality of paths.

In the analog optical transmission system according to the present invention, when a plurality of dispersion compensating modules are arranged on the optical transmission path, among these plurality of dispersion compensating modules, the dispersion compensating module for compensating the branched path having the smallest accumulated chromatic dispersion among the branched paths constituting multiple branched transmission lines including the optical branching device as the transmission path is preferably arranged immediately after said transmitter. It is because the number of the dispersion compensating modules in the multiple branched transmission line can be reduced.

Here, the transmission line may be constructed in a state where a normal SMF with a zero-dispersion wavelength of 1.3 μm and a different-type of fiber different from the single-mode fiber are mixed. It is because when the accumulated dispersion of the transmission line is reduced, the amount of dispersion compensation by the DCF can be reduced; thus, reduction of the MPI noise becomes possible in the whole transmission line.

Specifically, when a non-zero dispersion shifted fiber (hereinafter, referred to as NZ-DSF) is assumed for the different-type fiber, the NZ-DSF preferably has a chromatic dispersion whose absolute value is more than 1 ps/nm/km but 10 ps/nm/km or less at a signal light wavelength. When a dispersion shifted fiber (hereinafter, referred to as DSF) is assumed for the different-type of fiber, the DSF preferably has the chromatic dispersion whose absolute value is 0 pw/nm/km or more but 1 ps/nm/km or less at the signal light wavelength. Additionally, the transmission line may include an optical fiber having a chromatic dispersion whose absolute value is 1 ps/nm/km or more but 10 ps/nm/km or less at the signal light wavelength. Specifically, in order to expand the loss budget in the transmission loss, part or all of the transmission line is preferably constituted by an optical fiber having a core made of pure silica (hereinafter, referred to as pure silica core fiber). In addition, non-intentionally doped silica is also contained in the "pure silica" in the specification. That is, even when other impurities such as chlorine is somewhat contained non-intentionally, when the silica is the one such that its impurity concentration does not substantially affect on the transmission characteristics, it is contained in the "pure silica" in this specification.

Furthermore, in order to suppress the occurrence of Raleigh scattering light in the transmission line and reduce the MPI noise, the transmission line preferably contains a chromatic dispersion whose absolute value is 18 ps/nm/km or more but 30 ps/nm/km or less at a signal light wavelength, and an optical fiber. having an effective area of 90 μm² or more but 220 μm² or less. Besides, in order to reduce the amount of the dispersion compensation by the DCF by reducing the accumulated chromatic dispersion of the transmission line, which enables the reduction of the MPI noise over the whole transmission line, the transmission line preferably contains the chromatic dispersion whose absolute value is 1 ps/nm/km or more but 16 ps/nm/km or less at a signal light wavelength, and an optical fiber having an effective area of 20 µm² or more but 90 µm² or less.

The analog optical transmission line according to the present invention may further comprise an optical attenuator arranged on the upper stream side of the DCF. It is because in this case, the degradation of the transmission characteristics caused by a non-linear optical phenomenon occurred in the DCF may be avoided.

Further, in order to compensate the transmission loss in the DCF in the DCF itself and enlarge the loss budget of the transmission line, the analog optical transmission system in accordance with the invention can also use the DCF itself as a fiber for Raman amplification. In this case, the analog optical transmission system further includes a pumping light source for outputting pumping light having a predetermined wavelength to carry out the Raman amplification in the DCF, and an optical multiplexer for guiding the pumping light from the pumping light source to the DCF.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a diagram illustration of the construction of an estimation model prepared as an analog optical transmission system;

FIG. 5 is a table showing the various characteristics of the two types of dispersion compensating fibers (DCF);

FIG. 6 is a graph showing the relationship between the length of dispersion compensating fiber (length of DCF) and the chromatic dispersion where the length of transmission line is set as a parameter;

FIG. 23 shows the construction of a fifth embodiment in the analog optical transmission system according to the present invention.

DETAILED DESCRIPTION OF THE PREFERRED EMBODIMENTS

Figure 2A:
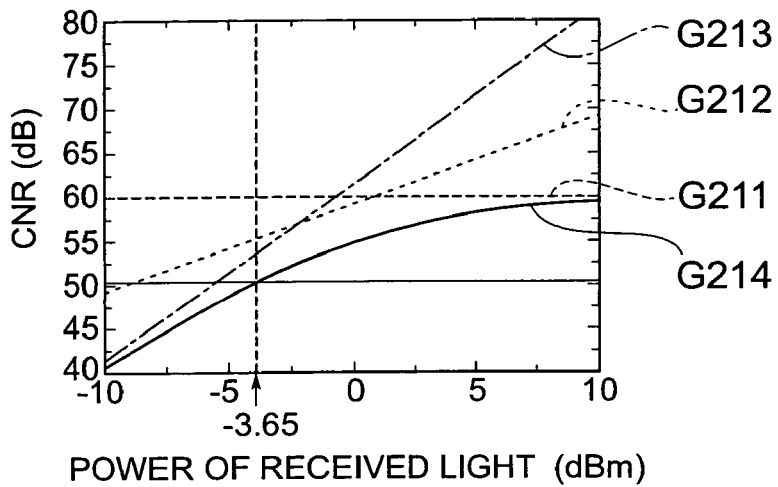
FIGS. 2A–2C are graphs showing simulation results in the analog optical transmission system shown in FIG. 1.

In the following, embodiments of analog optical transmission systems according to the present invention will be described in detail with reference to FIGS. 1, 2A–2C, 3–6, 7A–8B, 9, 10A–11C, 12, 13A–19C, 20, 21A–21C, 22–23 and 24A–24B. In the explanation of the drawings, constituents identical to each other will be referred to with numerals identical to each other without repeating their overlapping descriptions.

An object for the present invention is to enlarge a transmittable distance in an analog optical transmission system employing a low-cost direct modulation laser (DML). In addition, the invention intends to expand the transmittable distance by avoiding effects of relative intensity noise (RIN) in transmission lines and dispersion compensating fibers (DCF). Specifically, in the analog optical transmission system according to the present invention, an application of the DCF having higher characteristics of FOM (Figure of Merit) than an ordinary DCF enables shortening of the DCF itself, and avoids the effects of the RIN; thus, enlargement of the transmittable distance is expected.

In this case, for the purpose of verifying now the transmittable distance, characteristic parameters will be defined as follows.

Thus, a signal-to-noise ratio in an optical AM-VSB (light-wave Amplitude Modulation Vestigial-SideBand) transmission (hereinafter, referred to as CNR: Carrier-to-Noise Ratio) is provided by the following equation (1), and is preferably 51 dB or more.

$$CNR^{-1} = \left\{ \frac{2RIN}{m^2} + \frac{4e(R_0 P_d + I_d)}{(mR_0 P_d)^2} + \frac{8k_B T F_r}{R_1 (mR_0 P_d)^2} \right\} B \qquad (1)$$

In this equation, RIN is the relative intensity noise in a semiconductor LD (typical value: −155 dB/Hz); m is the degree of modulation per channel (typical value: 5%); e is the electron elementary charge (typical value: $1.60 \times 10^{-19}$ C); $R_o$ is the receiving sensitivity (typical value: 0.85 A/W); $P_d$ is the receiving optical power (typical value: −4 dBm); $I_d$ is the dark current (typical value: 1 nA); $k_B$ is the Boltzmann's constant (typical value: $1.31 \times 10^{-23}$ J/K); T is the ambient temperature (typical value: 273 K); $F_r$ is the receiver noise index (typical value: 5 dB); and $R_1$ is the load resistance (typical value: 300 Ω).

In addition, an effect due to an optical connector in a transmission line is represented by the following equation (2). Normally, the RIN is preferably −155 dB/Hz when the RIN is considered in an optical transmitter.

$$RIN(f) = p \frac{4}{\pi} \left\{ \frac{\Delta v}{f^2 + (\Delta v)^2} \right\} \eta_{12} r_1 r_2 \qquad (2)$$

In this equation, f is the observed frequency; p is the polarized light coupling coefficient; p is the polarized light coupling coefficient of signal light and reflected light; $\Delta v$ is the spectral full width half maximum (FWHM) of a directly modulated light source (typical value: 5 GHz); $\eta_{12}$ is the transmissivity of a reflection path; and $r_1$ and $r_2$ are the reflectance at a reflection point.

Further, the effects of Rayleigh Scattering in optical fibers are represented by the following equations (3a) and (3b). Note that these equations (3a) and (3b) represent the effects where the MPI noise generated inside the transmission line is applied to the signal light. Accordingly, on development of the study, it becomes possible to approximate the analog transmittable distance even when the MPI noise is determined by simulation.

$$RIN(f) = R_{eq}^2 \frac{4}{\pi} \frac{\Delta v}{f^2 + (\Delta v)^2} \qquad (3a)$$

$$R_{eq} = \frac{S_R \alpha_S}{2\alpha} (2\alpha L - 1 + e^{-2\alpha L})^{1/2} \qquad (3b)$$

In the equations, $R_{eq}^2$ is the MPI noise; $S_R \alpha_S$ is the Rayleigh Scattering coefficient γ (1/m); α is the transmission line loss (typical value: 0.3 dB); and L is the fiber length.

The distortion characteristics on the chromatic dispersion, that is, mutual modulating components on the second order distortion (hereinafter, referred to as CSO: Composite Second Order beat) is provided by the following equation (4), and is preferably normally −60 dB or less.

$$CSO = 20 \log (n\sigma Lm \Delta \lambda f) \qquad (4)$$

In the equation, n is the number of channels; σ is the chromatic dispersion (typical value; 17 ps/nm/km); Δλ is the FM response (typical value: 150 MHz/mA).

The inventors calculated the effects of the receiving sensitivity, MPI noise, and chromatic dispersion by using the above calculation equations. FIG. 1 is a diagram illustrating the construction of a calculation model prepared as an analog optical transmission system. The analog optical transmission system shown in FIG. 1 includes an optical transmitter 10, an optical receiver 20, and a transmission line 30 composed of a single-mode fiber (SMF) arranged between these optical transmitter 10 and optical receiver 20.

Figure 2B:
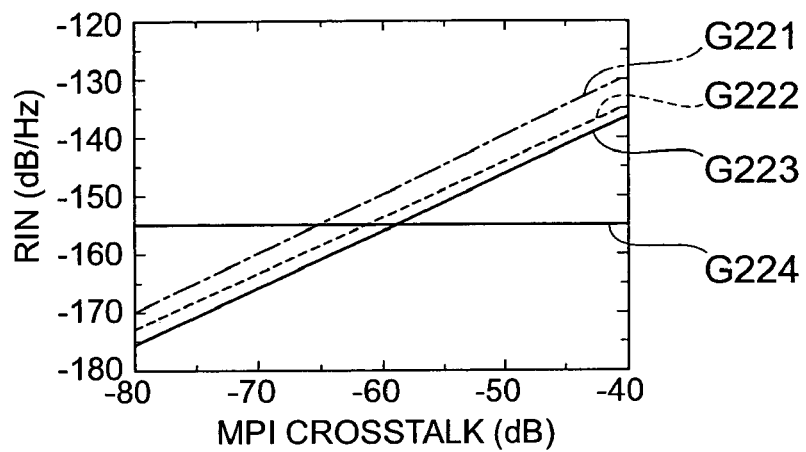
Figure 2C:
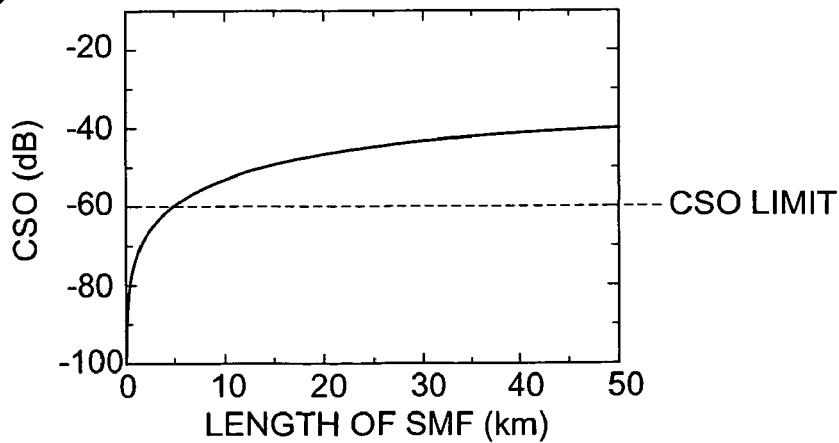

In addition, FIGS. 2A to 2C are graphs showing simulation results in the analog optical transmission system shown in FIG. 1. The loss of the transmission line herein is set to 0.3 dB/km. FIG. 2A shows the relationship between CNR and received optical power. In FIG. 2A, graph G211 shows the relationship with the RIN in the optical transmitter 10; graph G212 the relationship with shot noise; graph G213 the relationship with heat noise; and graph G212 the relationship with the total CNR. Since the CNR required for normal repeating-based analog transmissions is 51 dB or more, the receiving sensitivity required to achieve this level is −3.65 dBm or more. FIG. 2B shows the relationship between MPI crosstalk, which represents a ratio between signal light and MPI noise, and relative intensity noise (RIN), and represents a change when the spectral full width half minimum (FWHM) $\Delta v$ of a light source (directly modulated light source) is changed as the frequency f in the equations (3a) and (3b) is fixed to 445.25 MHz. That is, in FIG. 2B, graph G221 shows a change when $\Delta v = 1$ GHz; graph G222 shows a change when $\Delta v = 3$ GHz; graph G223 shows a change when $\Delta v = 5$ GHz; and graph G224 shows RIN =−155 dB/Hz. As the apparent from these results, the MPI crosstalk of at least −60 dB or less is required to suppress the RIN in the system within the characteristics on the order of the RIN of a laser (−155 dB/Hz). Further, FIG. 2C shows the relationship between transmission distance (assuming a SMF having the chromatic dispersion of 17 ps/nm/km at the wavelength of 1550 nm) and CSO. From FIG. 2C, it can be confirmed that the transmittable distance is at most around 5 km in order to suppress the degradation of the CSO under the influence of the chromatic dispersion.

Figure 3:
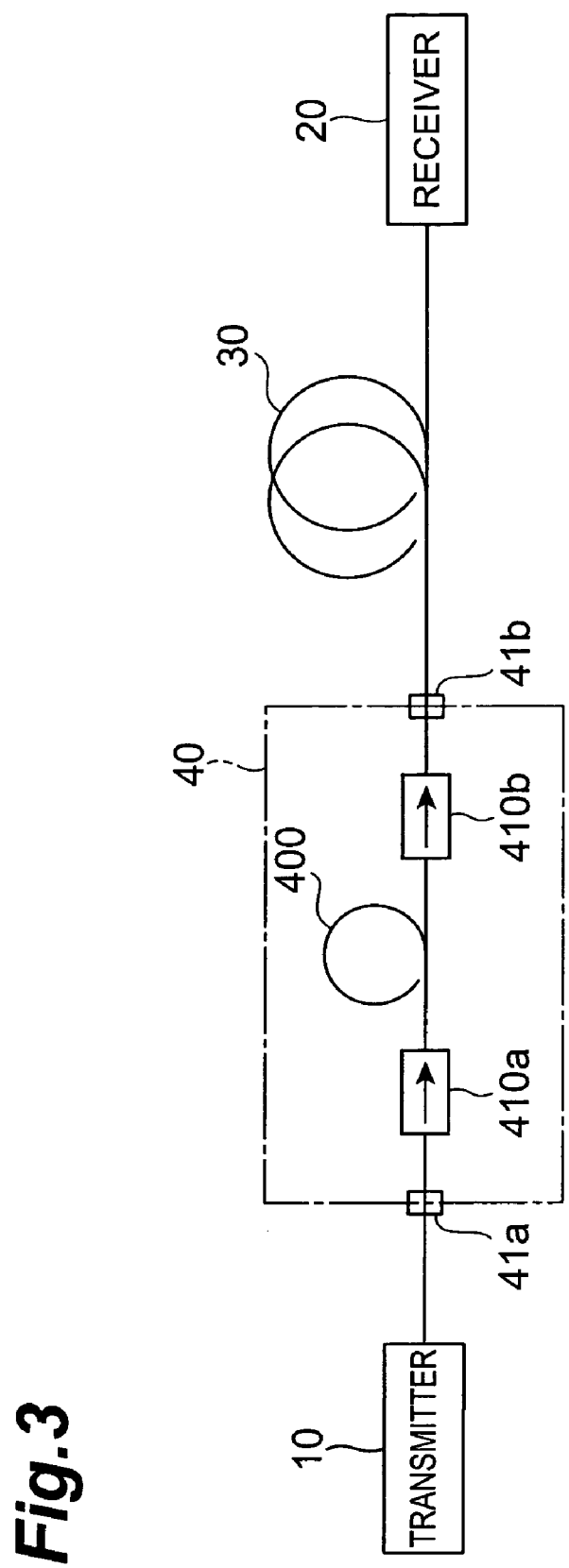
FIG. 3 is a diagram which illustrates the setup of a first embodiment of an analog optical transmission system according to the present invention.

For this reason, in the invention, improvement of the transmissible distance is intended. by the dispersion compensating module including the DCF. FIG. 3 is a diagram illustrating the construction of a first embodiment of an analog optical transmission system in accordance with the invention.

The analog optical transmission system according to the first embodiment is composed by an optical transmitter 10 containing DMLs, an optical receiver 20, a transmission line arranged between these optical transmitter 10 and optical receiver 20, and a dispersion compensating module 40. The dispersion compensating module 40 has optical connectors 41a, 41b to be provided detachably on the transmission line 30, a DCF 400 arranged between these optical connectors 41a, 41b, and optical isolators (hereinafter, referred to as ISO) 410a, 410b. However, an optical circulator may be applied instead of the ISO 410a, 410b. Incidentally, in the first embodiment, the dispersion compensating module 40 is arranged immediately after the optical transmitter, but it may be arranged anywhere on the transmission line 30.

Figure 4:
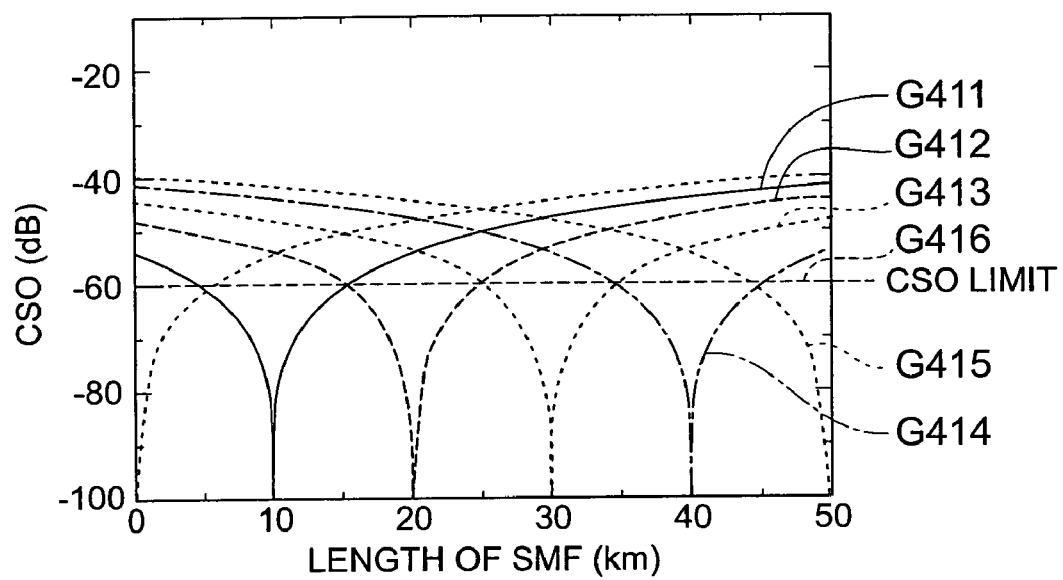
FIG. 4 is a graph representing the relationship between the length of the transmission line and CSO where the dispersion compensating distance is set as a parameter.

In such a construction, FIG. 4 shows the results representing the relationship between the length of the transmission line (length of SMF) and CSO, where the dispersion compensating distance is the parameter (FM response is 150 KHz/mA). Then, in FIG. 4, graph G411 shows the DCF which enables to compensate the chromatic dispersion of the SMF at 10 km; graph 412 shows the DCF which enables to compensate the chromatic dispersion of the SMF at 20 km; graph 413 shows the DCF which enables to compensate the chromatic dispersion of the SMF at 30 km; graph 414 shows the DCF which enables to compensate for the chromatic dispersion of the SMF at 40 km; graph 415 shows the DCF which enables to compensate for the chromatic dispersion of the SMF at 50 km; and graph 416 shows the state of no DCFs. According to the evident from the results, when the DCF is inserted on the transmission line, it is possible to maintain excellent transmission characteristics within the length of the transmission line ±5 km (approximately ±85 ps/nm/km when converted by accumulated dispersion values).

However, when the DCF is inserted on the transmission line, there are some cases that the characteristics of the Rayleigh scattering of the DCF and the characteristics of the MPI noise present problems. FIG. 5 shows the characteristics of the normal DCF (DCF-A) and the DCF (DCF-B) having the larger absolute value of the chromatic dispersion. Since the DCF-B has the larger absolute value of the chromatic dispersion, the length of fiber to be required for the chromatic dispersion is shorter; consequently, the value of the Rayleigh scattering, generated inside the dispersion compensating module, can be smaller. In this case, when such a DCF is connected to a normal SMF, a TEC (Thermally Expanded Core) connection is usually made in order to intend the reduction of the reduction of the connecting loss; however, in order to reduce the loss of the dispersion compensating module, it is necessary for the TEC connecting loss to have the connecting loss of at least 1 dB or less per one side.

FIG. 6 is the graph showing the relationship between the length of dispersion compensating fiber (length of DCF) and chromatic dispersion where the length of transmission line is the parameter. In FIG. 6, region A1 represents a region which enables to compensate the chromatic dispersion of the SMF at 10 km; region A2 represents a region which enables to compensate the chromatic dispersion of the SMF at 20 km; and region A3 represents a region which enables to compensate the chromatic dispersion of the SMF at 30 km. Specifically, when the case compensating the chromatic dispersion of the SMF at 20 km is considered, the upper side of the region A2 (region denoted by arrow S1) is the region not fully compensating the chromatic dispersion of the SMF, while the lower side of the region A2 (region denoted by arrow S2) is the region excessively compensating the chromatic dispersion of the SMF. As is apparent from FIG. 6, assuming that the DCF compensating the chromatic dispersion of the SMF at 20 km has the chromatic dispersion of −330 ps/nm/km, the DCF may have the length of fiber of 1.2 km or less, while assuming that this DCF has the chromatic dispersion of −250 ps/nm/km, the DCF may have the length of fiber of 1.1 km or less.

On the other hand, from the aforementioned simulation results, the analog optical transmission system needs to satisfy the following conditions: the whole MPI noise is −60 dB or less and the CSO also is −60 dB or less.

In particular, the MPI noise, $MPI_{TL}$, in the transmission line, and the MPI noise, $MPI_{DCF}$, in the DCF are defined by the following equations (5a) and (5b).

$$MPI_{TL} = \left(\frac{\gamma_{TL}}{2\alpha_{TL}}(2\alpha_{TL}L_{TL} - 1 + e^{-2\alpha_{TL}L_{TL}})^{1/2}\right)^2 \quad (5a)$$

$$MPI_{DCF} = \left(\frac{\gamma_{DCF}}{2\alpha_{DCF}}(2\alpha_{DCF}L_{DCF} - 1 + e^{-2\alpha_{DCF}L_{DCF}})^{1/2}\right)^2 \quad (5b)$$

In these equations, $\gamma$ is the Rayleigh scattering coefficient. Accordingly, in the whole system, the following equation must be satisfied.

$$MPI_{DCF} + MPI_{TL} \leq 10^{-6} \quad (6)$$

Thus, since the equation (6) must be satisfied for the whole system, the limitation of the length of DCF, $L_{DCF}$, is led from the equations (5b) and (6), as shown in the following equation (7).

$$L_{DCF} \leq \sqrt{\frac{2}{\lambda_{DCF}^2}(10^{-6} - MPI_{TL})} \quad (7)$$

Similarly, when the CSO is set to −60 dB or less in the whole system inserted by the DCR on the transmission line, the chromatic dispersion σL of the equation (4) is provided by $|\sigma_{DCF}L_{DCF} - \sigma_{TL}L_{TL}|$; thereby, the length of transmission line $L_{TL}$ and the length of DCF $L_{DCF}$ must also satisfy the following equation (8).

$$|\sigma_{DCF}L_{DCF} - \sigma_{TL}L_{TL}| \leq \frac{10^{-3}}{nm\Delta\lambda f} \quad (8)$$

From the above, when the length of the DCF such that the MPI noise at the DCR is allowable on system design is defined as the $L_{MPI}$, and the CSO corresponding to the chromatic dispersion to be generated in the DCF is defined such that the lower-limit length and upper-limit length of the DCF which is allowable on system design are respectively defined as $L_{CSO1}$ and $L_{CSO2}$, the length L of the DCF is preferably set to be larger than $L_{CSO1}$ but shorter than $L_{CSO2}$ when $L_{OS2} < L_{MPI}$, and to be larger than $L_{CSO1}$ but shorter than $L_{MPI}$ when $L_{CSO1} < L_{MPI} < L_{CSO2}$. Here, FIG. 6 incrementally shows the region of DCF length restricted by the upper limit of MPI noise (MPI upper limit), in the cases that SMF with a length of 10 km, SMF with a length of 20 km and SMF with a length of 30 km are respectively used. In FIG. 6, the alternate long and short dash lines indicate the upper limit of length of a normal DCF with a chromatic dispersion of −150 ps/nm/km to respective SMFs with 10 km, 20 km and 30 km. Further, the chain double-dashed lines indicate the upper limit of length of DCF with a chromatic dispersion of −330 ps/nm/km to respective SMFs with 10 km, 20 km and 30 km.

Figure 7A:
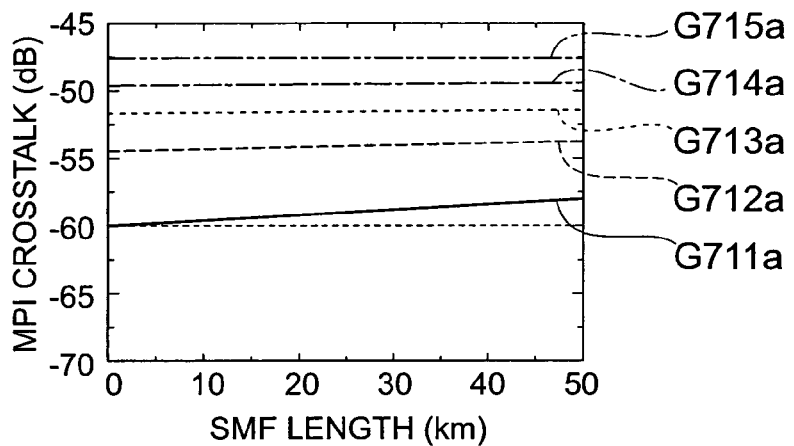
FIGS. 7A and 7B are graphs showing the relationships of the respective MPI crosstalk and power of received light to the length of a single mode fiber (SMF) that is a transmission line in the analog optical transmission system applied with the DCF-A shown in FIG. 5.
Figure 7B:
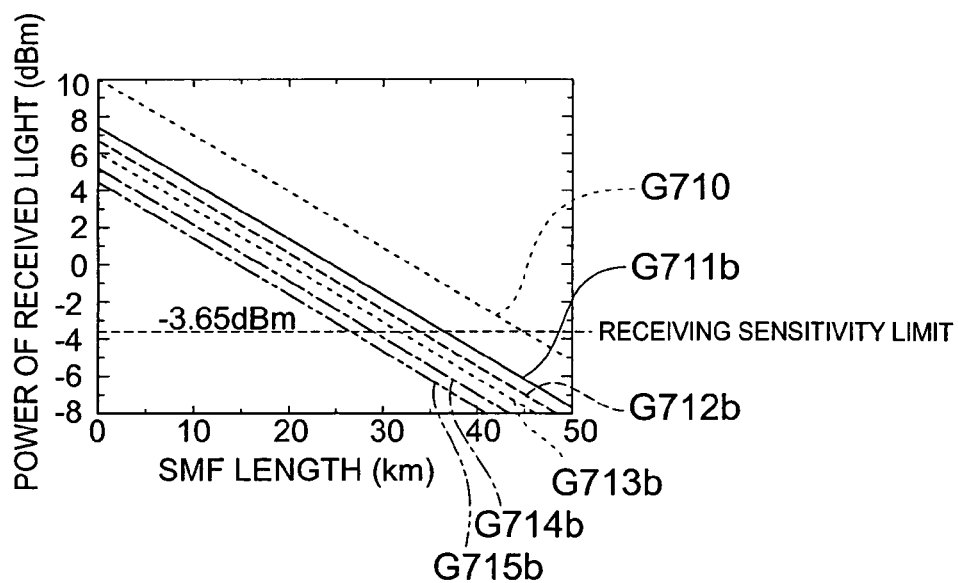

FIGS. 7A and 7B are graphs showing the relationships of the respective MPI crosstalk and power of received light to the length of a single mode fiber (SMF) that is a transmission line in the analog optical transmission system applied with the DCF-A shown in FIG. 5. Note that the transmission loss of the SMF is assumed as 0.3 dB. In FIG. 7A, graph G711a represents the change of MPI crosstalk at the DCF-A which enables to compensate the SMF at 10 km; graph G712a represents the change of MPI crosstalk at the DCF-A which enables to compensate the SMF at 20 km; graph G713a represents the change of MPI crosstalk at the DCF-A which enables to compensate the SMF at 30 km; graph G714a represents the change of MPI crosstalk at the DCF-A which enables to compensate the SMF at 40 km; and graph G715a represents the change of MPI crosstalk at the DCF-A which enables to compensate the SMF at 50 km. On the other hand, in FIG. 7B, graph G711b represents the change of power of received light when the DCF-A which enables to compensate the SMF at 10 km is applied; graph G712b represents the change of power of received light when the DCF-A which enables to compensate the SNF at 20 km is applied; graph G713b represents the change of power of received light when the DCF-A which enables to compensate the SMF at 30 km is applied; graph G714b represents the change of power of received light when the DCF-A which enables to compensate the SMF at 40 km is applied; graph G715b represents the change of power of received light when the DCF-A which enables to compensate the SMF at 50 km is applied; and graph G710b represents the change of power of received light when the DCF-A as a unit is applied for reference purposes.

Figure 8A:
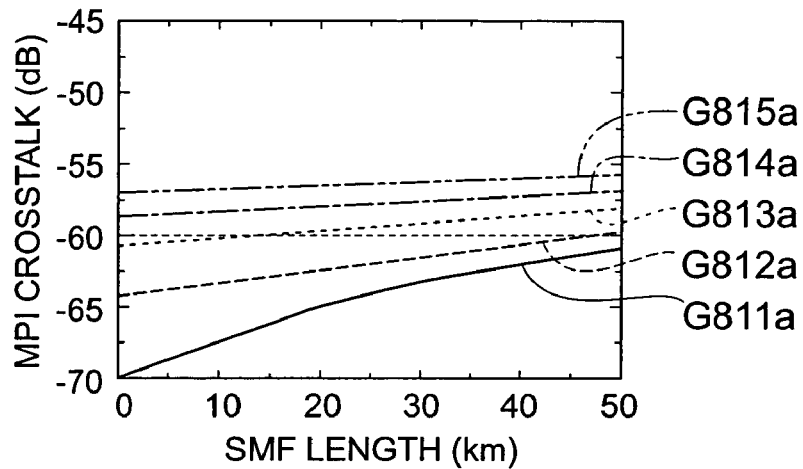
FIGS. 8A and 8B are graphs showing the relationships of the respective MPI crosstalk and power of received light to the length of a single mode fiber (SMF) that is a transmission line in the analog optical transmission system applied with the DCF-B shown in FIG. 5.
Figure 8B:
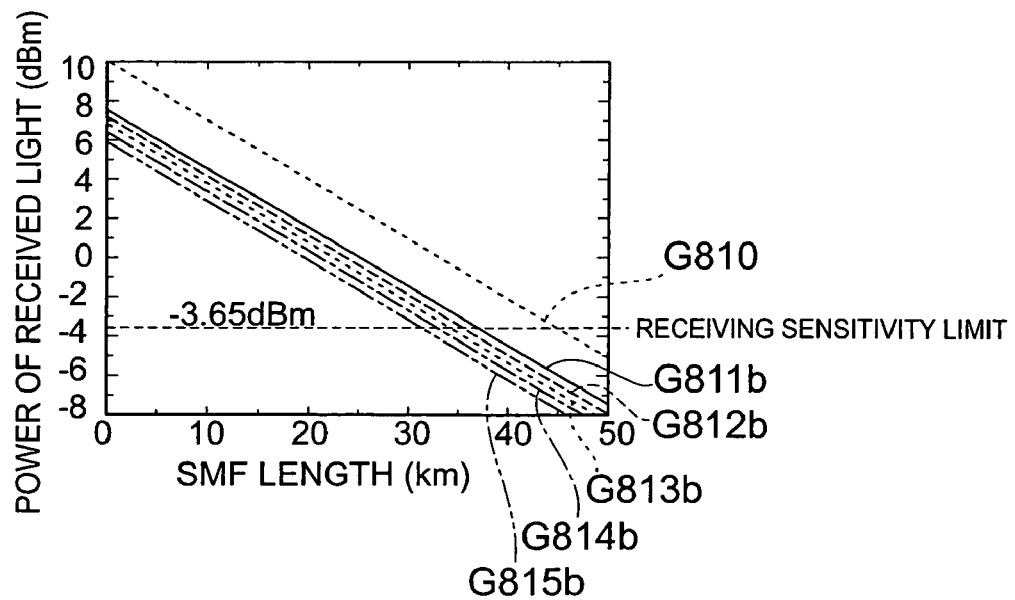

In addition, FIGS. 8A and 8B are graphs showing the relationships of the respective MPI crosstalk and power of received light to the length of a single mode fiber (SMF) that is a transmission line in the analog optical transmission system applied with the DCF-B shown in FIG. 5. Note that the transmission loss of the SMF is assumed as 0.3 dB. In FIG. 8A, graph G811a represents the change of MPI crosstalk at the DCF-B which enables to compensate the SMF at 10 km; graph G812a represents the change of MPI crosstalk at the DCF-B which enables to compensate the SMF at 20 km; graph G813a represents the change of MPI crosstalk at the DCF-B which enables to compensate the SMF at 30 km; graph G814a represents the change of MPI crosstalk at the DCF-B which enables to compensate the SMF at 40 km; and graph G815a represents the change of MPI crosstalk at the DCF-B which enables to compensate the SMF at 50 km. On the other hand, in FIG. 8B, graph G811b represents the change of power of received light when the DCF-B which enables to compensate the SMF at 10 km is applied; graph G812b represents the change of power of received light when the DCF-B which enables to compensate the SMF at 20 km is applied; graph G813b represents the change of power of received light when the DCF-B which enables to compensate the SMF at 30 km is applied; graph G814b represents the change of power of received light when the DCF-B which enables to compensate the SMF at 40 km is applied; graph G815b represents the change of power of received light when the DCF-B which enables to compensate the SMF at 50 km is applied; and graph G810b represents the change of power of received light when the DCF-B as a unit is applied for reference purposes.

As is apparent from FIG. 7A and FIG. 8B, in the system employed with the DCF-A (normal DCF), the MPI crosstalk cannot satisfy the crosstalk of −60 dB or less, while in the system applied with the DCF-B (DCF having the larger absolute value in the chromatic dispersion), even when the dispersion compensation is carried out to the SMF at 20 km, the MPI crosstalk can satisfy a targeted value. This means that even in the conventional analog transmission of the DML which could transmit only several kilometers, a non-repeating transmission of 25 km or more becomes possible. As is apparent from FIG. 7A and FIG. 8B, when the transmission distance is on the order of 30 km, a sufficient receiving sensitivity can be obtained.

Figure 9:
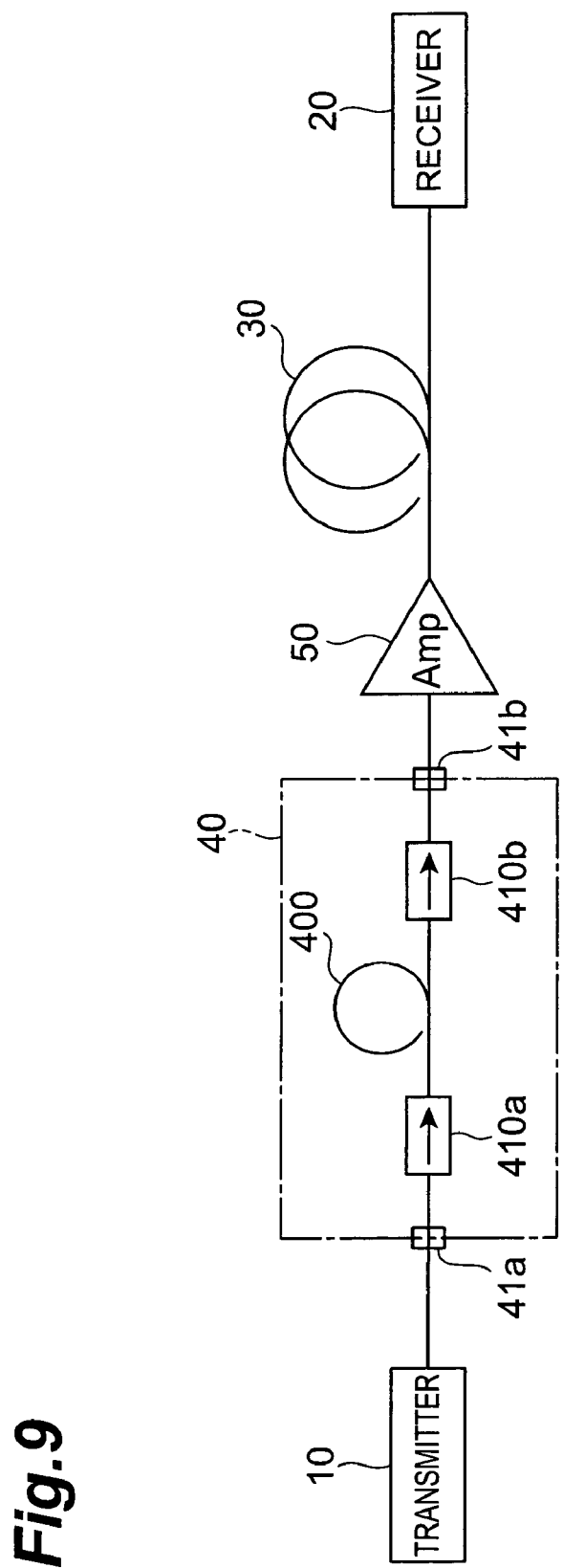
FIG. 9 is a diagram illustration of a second embodiment of the analog optical transmission system according to the present invention.
Figure 10A:
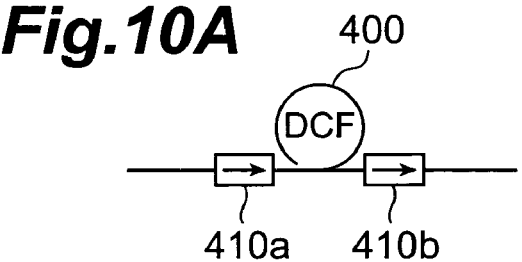
FIGS. 10A to 10E are diagram illustrations of the constructions of the dispersion compensating fibers (DCFs) installed in a dispersion compensating module.
Figure 10B:
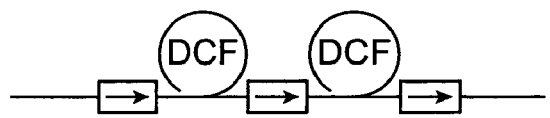
Figure 10C:
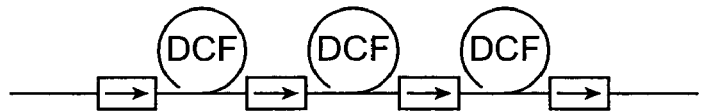
Figure 10D:
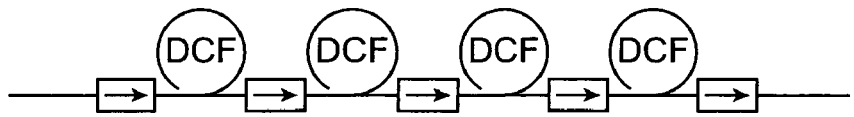
Figure 10E:
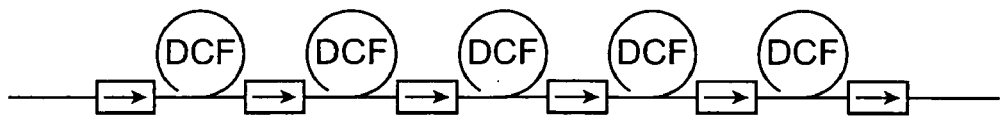

However, when the loss of the transmission line is 0.3 dB/km or more, it is required to compensate the loss of the transmission line by arranging an optical amplifier on the transmission line, as shown in FIG. 9. Thus, FIG. 9 is a diagram illustrating a second embodiment of the analog optical transmission system in accordance with the invention. The second embodiment includes the construction similar to the aforementioned first embodiment except that an optical amplifier 50 is arranged on a transmission line 30. In the analog optical transmission system in accordance with the second embodiment, the optical amplifier 50 may be arranged immediately after an optical transmitter 10, arranged on the side of a dispersion compensating module 40, and further arranged immediately before an optical receiver 20.

Further, in order to achieve a longer distance of the analog transmission, (1) ensuring the loss budget of the whole transmission line, (2) dispersion compensating, and (3) reducing the MPI crosstalk must be carried out.

As to the item (1), the loss budget can ensure the loss budget of the whole transmission line by using the optical amplifier. In this case, an erbium-doped optical fiber amplifier, erbium-doped optical amplifying waveguide, Raman amplifier, semiconductor optical amplifier, or the like is applicable to the optical amplifier. However, the distortion of the optical amplifier is preferably smaller.

Figure 11A:
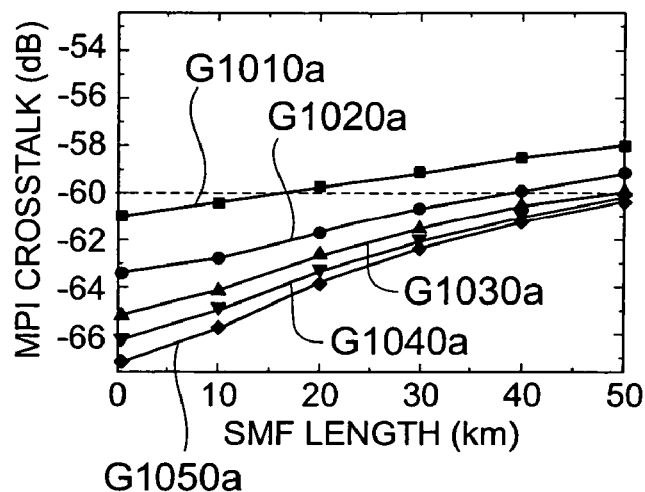
FIGS. 11A to 11C each show the relationship between the division number of the dispersion compensating fiber (DCF) and the MPI crosstalk with respect to different dispersion compensating distances.
Figure 11B:
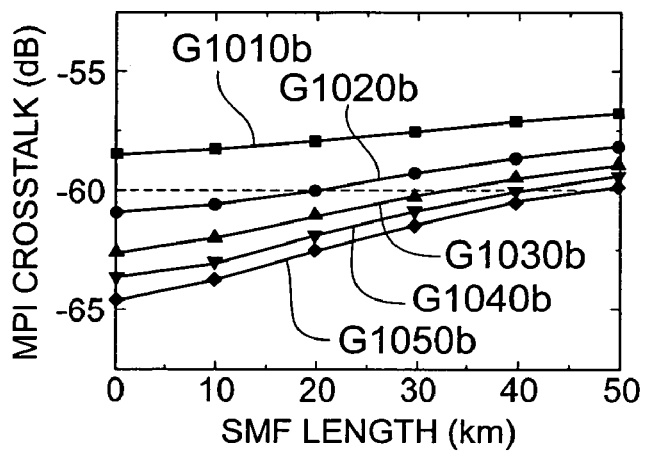
Figure 11C:
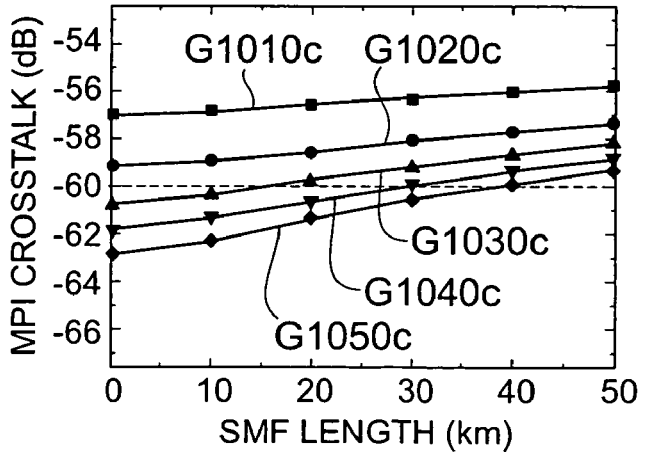

On the other hand, as to the items (2) and (3), since a trade-off relationship between the amount of the dispersion compensation by the dispersion compensating module and the MPI noise is established, it becomes very difficult to proceed with the study when a DCF with a unitary length is applied. In order to solve this problem, as shown in FIGS. 10A to 10E, a DCF 400 is divided into a plurality of fiber elements, and an ISO is arranged between these fiber elements; thus, it is required to suppress the Rayleigh scattering light generated inside the DCF. Additionally, FIGS. 10B to 10E illustrate the construction when the DCF is two- to five-divided, respectively. In addition, FIGS. 11A to 11C show the change of the MPI crosstalk to the division number of the DCF. Thus, FIG. 11A show calculation results where the SMF at 30 km is dispersion-compensated by the DCF-B; in FIG. 11A, graph 1010a represents the results compensated by the DCF with a unitary length; graph 1020a represents the results compensated by the two-divided DCF; graph 1030a represents the results compensated by the three-divided DCF; graph 1040a represents the results compensated by the four-divided DCF; and graph 1050a represents the results compensated by the fifth-divided DCF. FIG. 11B show calculation results where the SME at 40 km is dispersion-compensated by the DCF-B; in FIG. 11B, graph 1010b represents the results compensated by the DCF with a unitary length; graph 1020b represents the results compensated by the two-divided DCF; graph 1030b represents the results compensated by the three-divided DCF; graph

1040*b* represents the results compensated by the four-divided DCF; and graph 1050*b* represents the results compensated by the fifth-divided DCF. Further, FIG. 11C show calculation results where the SMF at 50 km is dispersion-compensated by the DCF-B; in FIG. 11C, graph 1010*c* represents the results compensated by the DCF with a unitary length; graph 1020*c* represents the results compensated by the two-divided DCF; graph 1030*c* represents the results compensated by the three-divided DCF; graph 1040*c* represents the results compensated by the four-divided DCF; and graph 1050*c* represents the results compensated by the fifth-divided DCF.

As is apparent from the results shown in FIGS. 11A to 11C, it is confirmed that the analog transmission at 30 km, impossible to achieve in the DCF-B with a unitary length, was achieved by the two-divided DCF-B, and that the analog transmission at 40 km can be achieved by the four-divided DCF-B.

Therefore, the length of the DCF is defined as $L_{MPI}$ where the MPI noise at the DCF is converted to the fiber with a unitary length, which is permissible on system design, while the lower-limit length and upper-limit length are respectively defined by $L_{CSO1}$ and $L_{CSO2}$ where the CSO corresponding to the chromatic dispersion generated within the DCF is converted as the fiber with a unitary length, which is permissible on system design; in such a case, even when the conversion length $L_{MPI}$ is shorter than the lower-limit value $L_{CSO1}$, the MPI noise on the whole system can be reduced by the ISO arranged between the fiber elements; thus, the total length L of these plurality of fiber elements may be set to be longer than $L_{CSO1}$ but shorter than $L_{CSO2}$.

Figure 12:
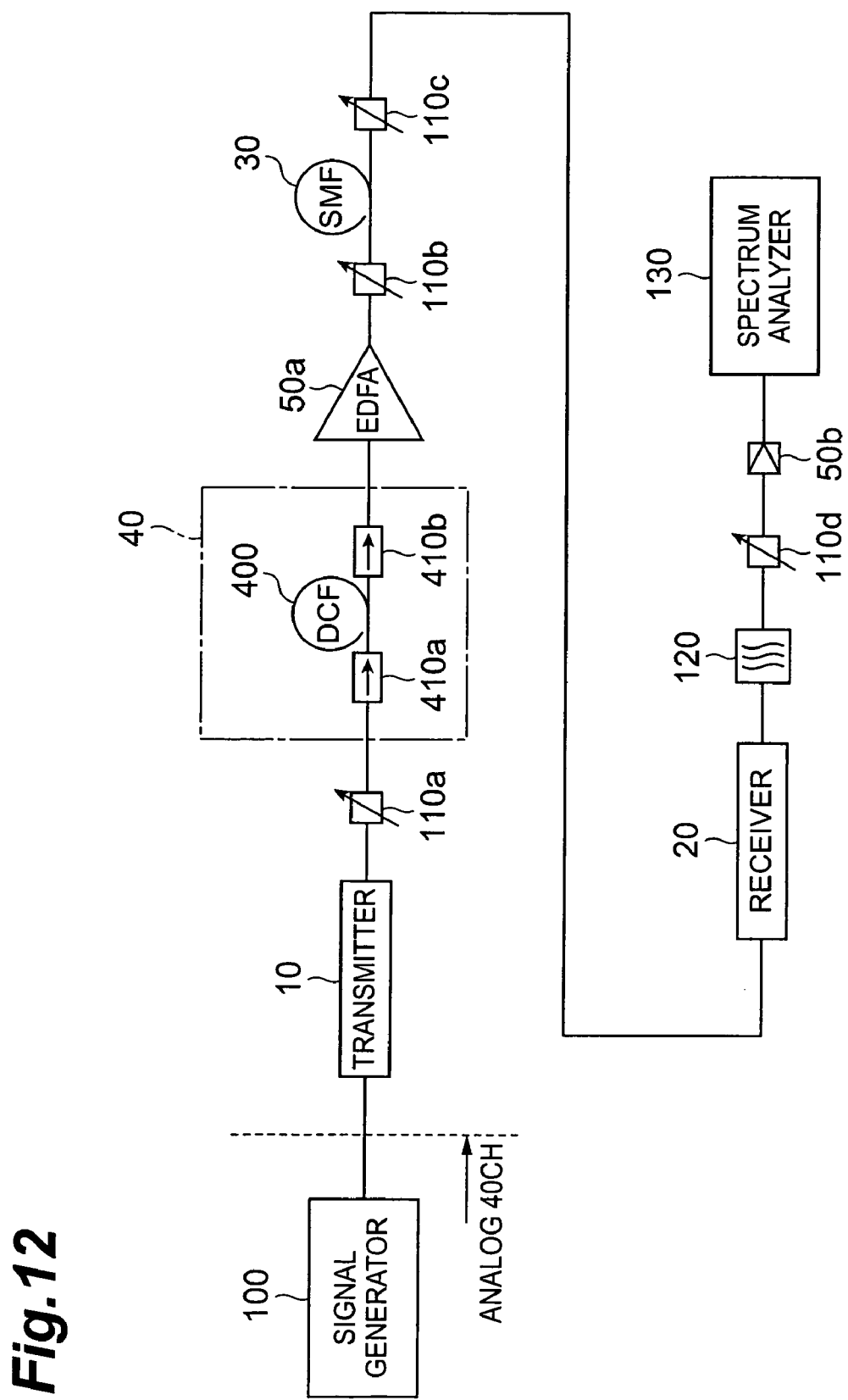
FIG. 12 is a diagram which illustrates the construction of an experimental setup that is prepared as an analog optical transmission system according to the present invention.

In the following, the experimental results of AM-VSB (lightwave Amplitude Modulation Vestigial-SideBand) that is prepared as an experimental setup of an analog optical transmission system according to the present invention. FIG. 12 is a diagram illustrating the construction of an experimental setup that is prepared as an analog optical transmission system according to the present invention.

The experimental setup, shown in FIG. 12, comprises: a transmitter 10; a modulated signal generator 100 outputting electric signals for modulating optical signals to be outputted from the transmitter 10; a receiver 20; and a monitor system monitoring the receiver 20. The experimental setup further comprises; a variable attenuator 110*a*; dispersion compensating module 40; EDFA (Erbium-Doped Fiber Amplifier) 50*a*; a variable attenuator 110*b*; SMF 30 as a transmission line; a variable attenuator 110*c* in the order from the transmitter 10 to the receiver 20. The dispersion compensating module is constituted by two ISO 410*a*, 410*b* and a dispersion compensating fiber 400 arranged between the ISO 410*a*, 410*b*. Additionally, the monitor system includes a spectrum analyzer 130, and further comprises: a bandpass filter 120; a variable attenuator 110*d*; and an amplifier in the order from the receiver 20 to the spectrum analyzer 130.

Figures 13A, 13B:
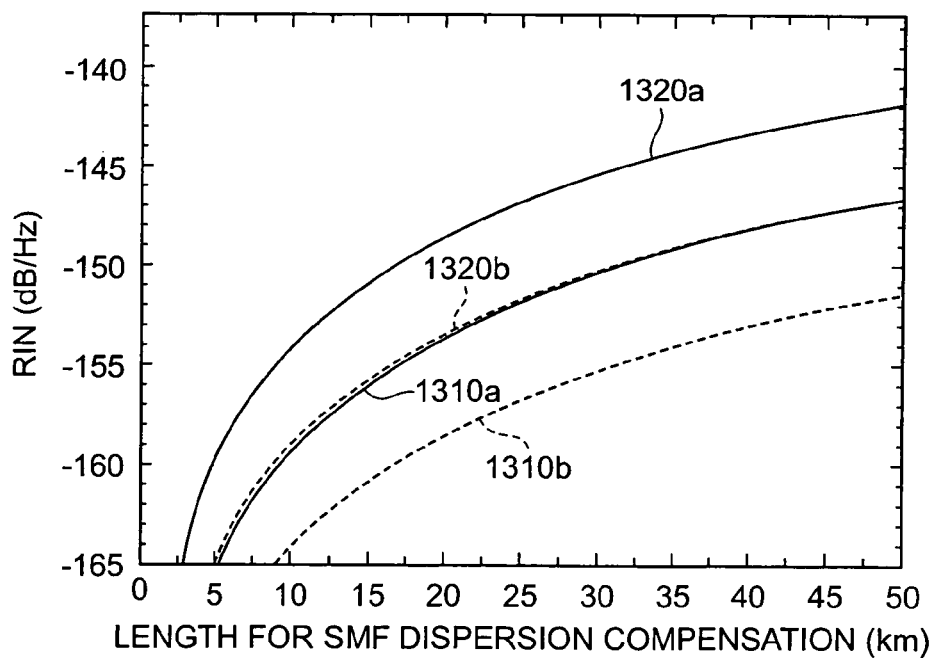
FIG. 13A is a table showing the various characteristics of the further two types of dispersion compensating fibers (DCF)
FIG. 13B is a graph showing the relationship of the relative intensity noise (RIN) and the length for SMF dispersion compensation.

FIG. 13A is a table showing the various characteristics of DCFs that are prepared for the experimental setup shown in FIG. 12. The DCF-C has a length L of 1.58 km, a transmission loss α of 0.91 dB, a loss after module of 2.0 dB, a chromatic dispersion of −297.4 ps/nm/km, a dispersion slope of −0.114 ps/nm²/km, a length for SMF dispersion compensation of 28.5 km, and a Rayleigh Scattering coefficient of $4.7\times10_{-7}$ (1/m). On the other hand, the DCF-D has a length L of 3.09 km, a transmission loss α of 0.65 dB, a loss after module of 2.9 dB, a chromatic dispersion of −149.7 ps/nm/km, a dispersion slope of −0.474 ps/nm²/km, a length for SMF dispersion compensation of 28.0 km, and a Rayleigh Scattering coefficient of $4.2\times10^{-7}$ (1/m). Both DCF-C and DCF-D can compensate for the chromatic dispersion of SMF with about 28 km, but the DCF-C has a smaller length than that of DCF-D because the DCF-C has a larger absolute value of chromatic dispersion than that of DCF-D. In addition, when ISOs 410*a*, 410*b* are disposed upstream and downstream of DCF400, a module loss of DCF-C is smaller than that of DCF-D at about 1 dB.

In addition, FIG. 13B, is a graph showing the relationship of the relative intensity noise (RIN) and the length for SMF dispersion compensation at RF signal frequency of 97.25 MHz. In FIG. 13B, graph G1310*a* represents the relationship in DCF-C at Δv=300 MHz, graph G1310*b* represents the relationship in DCF-C at Δv=1 GHz, graph G1320*a* represents the relationship in DCF-D at Δv=300 MHz, and graph G1320*b* represents the relationship in DCF-D at Δv=1 GHz. As can be seen from FIG. 13B, DCF-C can suppress the increase of RIN at about 5 dB as compared with DCF-D. Accordingly, DCF-C can drastically suppress the CNR deterioration at the dispersion compensation, as compared with DCF-D.

In the experimental setup shown in FIG. 12, the transmitter 10 includes a directly modulated LD, and 40-channel RF signals from 91.25 MHz to 415.25 MHz are modulated. The modulation index per one channel is 4.2%. At the upstream of DCF 400 (DCF-C or DCF-D), the ISO 410*a* is arranged so as to prevent multiple reflection between other optical components. The power of light inputted to the ISO 410*a* is set at 3.9 dBm in order to prevent nonlinear phenomena (phase shift caused by self-phase modulation or stimulated Brillouin scattering) in DCF 400. Also, the light having passed through DCF 400 is amplified by EDFA 50*a*, the variable attenuators 110*b* is adjusted such that the light with the power of 13 dBm is inputted to SMF 30 and the light with the power of 0 dBm reaches the receiver 20 respectively.

Figure 14A:
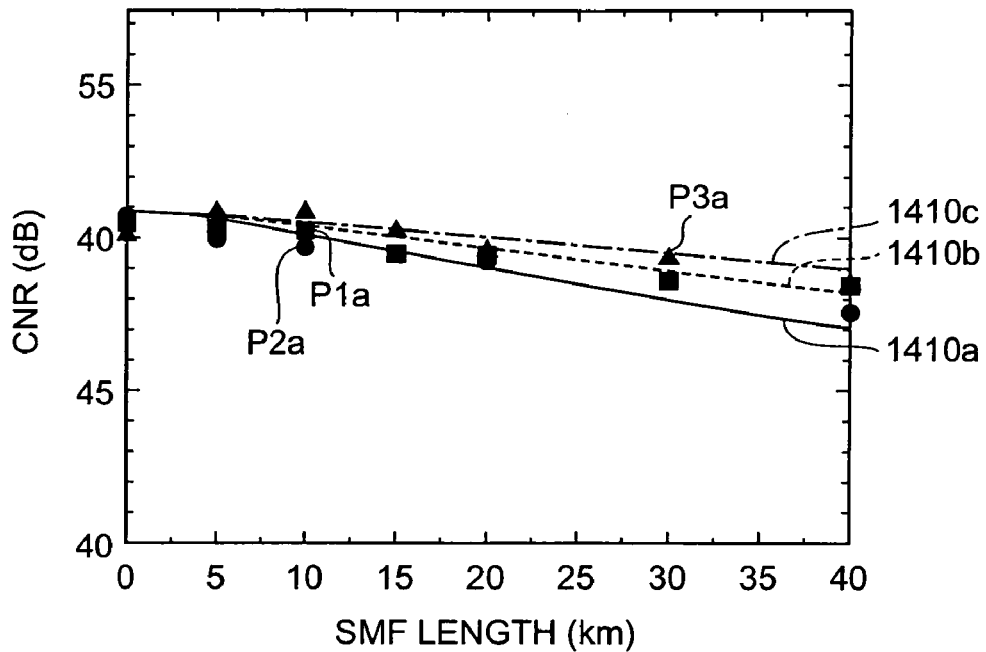
FIGS. 14A and 14B are graphs showing the experimental results of CNR characteristics in the 40-ch analog transmission.
Figure 14B:
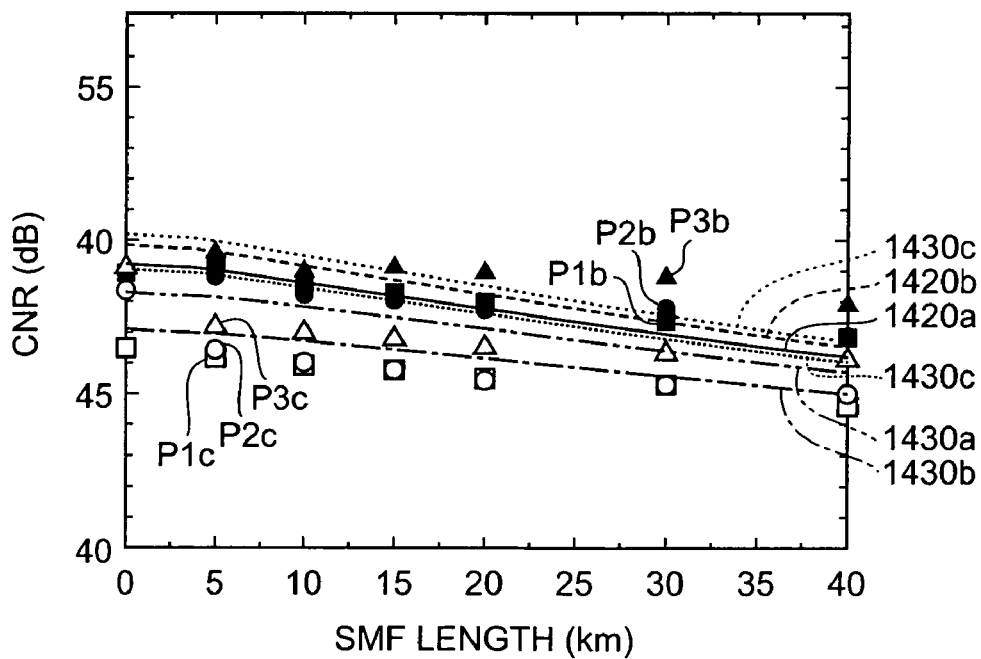

In the experimental set, the transmission characteristics when varying a fiber length was evaluated at the condition that a common SMF is used as a transmission line. In this experiment, CNR>46 dB and CSO<−60 dB are set as a reference of characteristics for good transmission condition. FIGS. 14A and 14B are graphs showing the experimental results of CNR characteristics in the 40-ch analog transmission. Further, these figures show theoretical calculation results at Δv=300 MHz together with the experimental results. As can be seen from FIGS. 14A and 14B, the experimental results and the theoretical calculation results are generally correspond to each other. FIG. 14A shows theoretical calculation results and experimental results without dispersion compensation, and in FIG. 14A, graph G1410*a* represents a theoretical calculation result at RF frequency of 97.25 MHz, graph G1410*b* represents a theoretical calculation result at RF frequency of 277.25 MHz, and graph G1410*c* represents a theoretical calculation result at RF frequency of 415.25 MHz. In addition, the symbol "■" represents an experimental result at RF frequency of 97.25 MHz, the symbol "●" represents an experimental result at RF frequency of 277.25 MHz, and the symbol "▼" represents an experimental result at RF frequency of 415.25 MHz. On the other hand, FIG. 14B shows theoretical calculation results and experimental results with dispersion compensation, and in FIG. 14B, graph G1420*a* represents a theoretical calculation result of DCF-C at RF frequency of 97.25 MHz, graph G1420*b* represents a theoretical calculation result of DCF-C at RF frequency of 277.25 MHz, graph G1420*c* represents a theoretical calculation result of DCF-C at RF frequency of 415.25 MHz, the symbol "■" represents an experimental result of DCF-C at RF frequency of 97.25 MHz, the symbol "●" represents an experimental result of DCF-C at RF frequency of 277.25 MHz, and the symbol "▼" represents an experimental result of DCF-C at RF frequency of 415.25 MHz. Furthermore, in FIG. 14B, graph G1430a represents a theoretical calculation result of DCF-D at RF frequency of 97.25 MHz, graph G1430b represents a theoretical calculation result of DCF-D at RF frequency of 277.25 MHz, graph G1430c represents a theoretical calculation result of DCF-D at RF frequency of 415.25 MHz, the symbol "■" represents an experimental result of DCF-D at RF frequency of 97.25 MHz, the symbol "●" represents an experimental result of DCF-D at RF frequency of 277.25 MHz, and the symbol "▼" represents an experimental result of DCF-D at RF frequency of 415.25 MHz.

As can be seen from FIG. 14A, in the case of transmitter 10 only (dispersion compensation is not performed), CNR at the input end of the SMF transmission line 30 is 50 dB or more, and CNR deteriorates due to the increase of MPI in SMF transmission line 30 when a length of the SMF transmission line 30 increases. In contrast, as can be seen from FIG. 14B, in the case that dispersion compensation by DCF-C or DCF-D is performed, CNR deteriorates due to MPI in each DCF, but CNR at the 40 km-SMF transmission becomes 47.5 dB when DCF-C is used and becomes 44.5 dB when DCF-D is used. Accordingly, DCF-C can suppress the CNR deterioration at about 3.0 dB as compared with DCF-D.

Figure 15A:
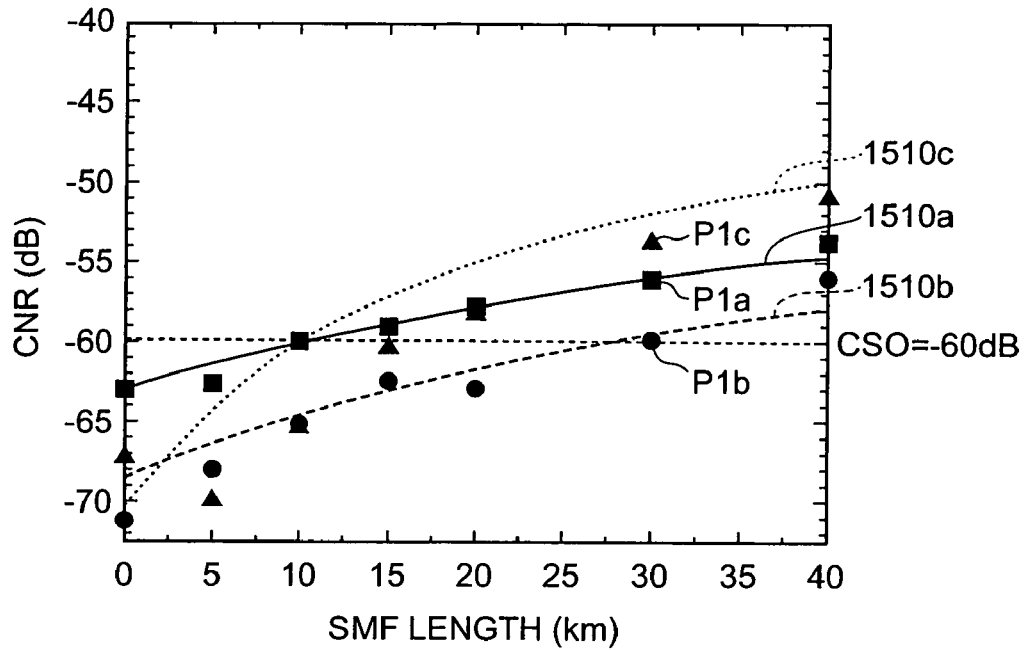
FIGS. 15A and 15B are graphs showing the experimental results of CSO characteristics in the 40-ch analog transmission.
Figure 15B:
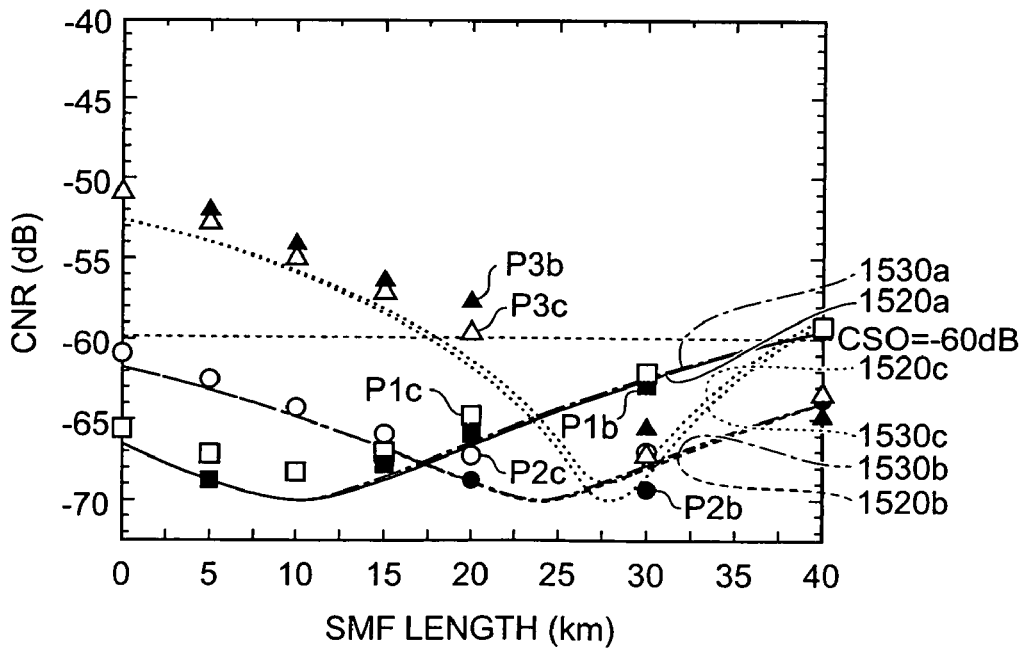

Furthermore, FIGS. 15A and 15B are graphs showing the experimental results of CSO characteristics in the 40-ch analog transmission. Further, these figures show CSO theoretical calculation results considering an effect that a part of distortion components of transmitter 10 gives to CSO, together with the experimental results. In this case, the experimental results and the theoretical calculation results are approximately correspond to each other. FIG. 15A shows theoretical calculation results and experimental results without dispersion compensation, and in FIG. 15A, graph G1510a represents a theoretical calculation result at RF frequency of 97.25 MHz, graph G1510b represents a theoretical calculation result at RF frequency of 277.25 MHz and graph G1510c represents a theoretical calculation result at RF frequency of 415.25 MHz. In addition, the symbol "■" represents an experimental result at RF frequency of 97.25 MHz, the symbol "●" represents an experimental result at RF frequency of 277.25 MHz, and the symbol "▲" represents an experimental result at RF frequency of 415.25 MHz. On the other hand, FIG. 15B shows theoretical calculation results and experimental results with dispersion compensation, and in FIG. 15B, graph G1520a represents a theoretical calculation result of DCF-C at RF frequency of 97.25 MHz, graph G1520b represents a theoretical calculation result of DCF-C at RF frequency of 277.25 MHz, graph G1520c represents a theoretical calculation result of DCF-C at RF frequency of 415.25 MHz, the symbol "■" represents an experimental result of DCF-C at RF frequency of 97.25 MHz, the symbol "0" represents an experimental result of DCF-C at RF frequency of 277.25 MHz, and the symbol "▲" represents an experimental result of DCF-C at RF frequency of 415.25 MHz. Furthermore, in FIG. 15B, graph G1530a represents a theoretical calculation result of DCF-D at RF frequency of 97.25 MHz, graph G1530b represents a theoretical calculation result of DCF-D at RF frequency of 277.25 MHz, graph G1530c represents a theoretical calculation result of DCF-D at RF frequency of 415.25 MHz, the symbol "■" represents an experimental result of DCF-D at R-F frequency of 97.25 MHz, the symbol "●" represents an experimental result of DCF-D at RF frequency of 277.25 MHz, and the symbol "▲" represents an experimental result of DCF-D at RF frequency of 415.25 MHz.

As can be seen from FIG. 15A, in the case of transmitter 10 only (dispersion compensation is not performed), CSO becomes more than −60 dB, and a transmission length is about 10 km. On the other hand, as can be seen from FIG. 15B, in the case that dispersion compensation by DCF-C or DCF-D is performed, CSO becomes less than −60 dB at the condition that a length of the SMF transmission line 30 is 25 to 30 km.

As described above, in the analog transmission experiment with dispersion compensation of DCF-C, 40-ch analog signals can be transmitted at about 30 km while maintaining a good transmission condition of CNR>46 dB and CS<−60 dB, and therefore it was able to be confirmed the advantage of DCF-C rather than DCF-D.

Figure 16A:
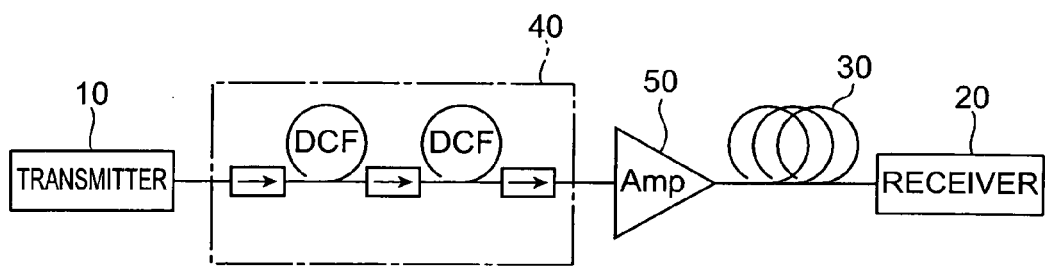
FIGS. 16A to 16C are diagrams which illustrate the constructions (two-divided DCF) of a third embodiment of the analog optical transmission system according to the present invention.
Figure 16B:
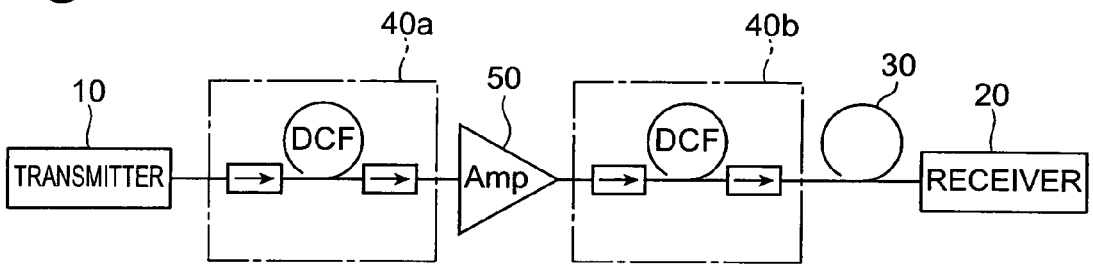
Figure 16C:
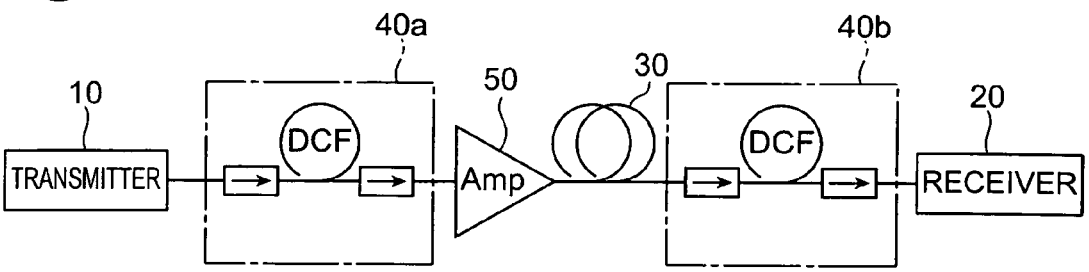

Next, a case where the DCF divided by a plurality of fiber elements is applied to the dispersion compensating module will be described. FIGS. 16A to 16C are diagrams illustrating the constructions (two-divided DCF) of a third embodiment of the analog optical transmission system according to the present invention.

The analog optical transmission system shown in FIG. 16A has the substantially same structure as that of the analog optical transmission system (FIG. 9) according to the second embodiment; however, there is a difference in that a two-divided DCF (fiber element) is arranged within the dispersion compensating module 40. In addition, in the analog optical transmission system shown in FIG. 16B, a dispersion compensating module 40a containing one of two-divided fiber elements (DCF) is arranged immediately after an optical transmitter 10, while a dispersion compensating module 40b containing the other fiber element (DCF) is arranged at transmission line elements 30a, 30b which constitute a transmission line 30. Furthermore, in the analog optical transmission system shown in FIG. 16C, the dispersion compensating module 40a containing one of two-divided fiber elements (DCF) is arranged immediately after the optical transmitter 10, while the dispersion compensating module 40b containing the other fiber element (DCF) is arranged immediately before an optical receiver 20.

Furthermore, in the analog optical transmission system where the plurality of dispersion compensating modules 40a, 40b are arranged on the transmission line as stated above, the total MPI noise of the dispersion compensating elements, which is permissible on system design, is defined as $MPI_{DCF}$, and the lower-limit and upper-limit values of the accumulated chromatic dispersion to obtain the CSO which is permissible on system design at the dispersion compensating elements are respectively defined as $D_1$ and $D_2$, preferably, the total at the effective MPI noise at each of these plurality of dispersion compensating modules is smaller than $MPI_{DCF}$, and the total of the accumulated chromatic dispersion at each of the plurality of dispersion compensating modules is larger than $D_1$ and smaller than $D_2$.

Figure 17A:
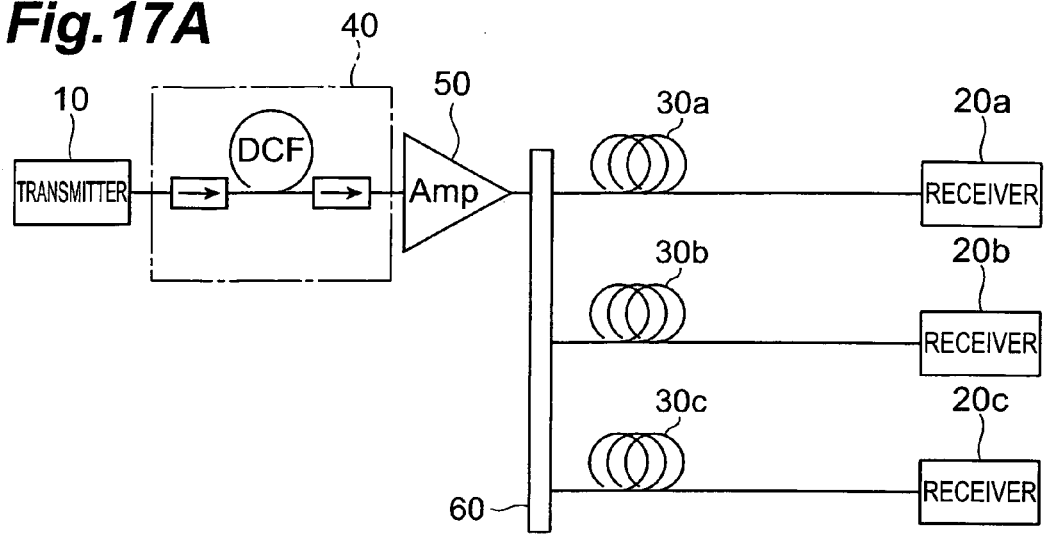
FIGS. 17A to 17C are diagrams which illustrate the construction of a fourth embodiment (multiple branched paths) of the analog optical transmission system.
Figure 17B:
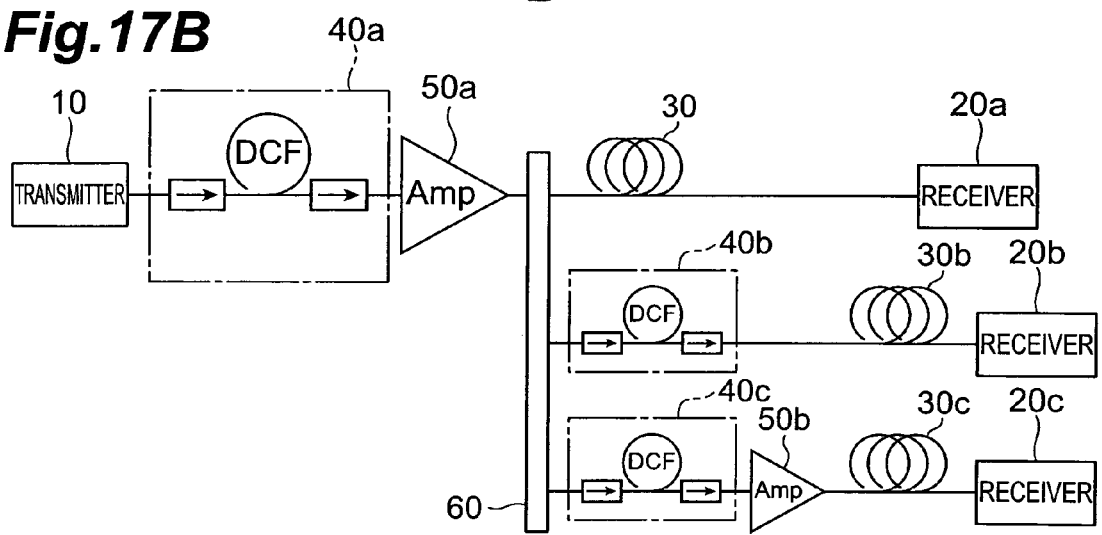
Figure 17C:
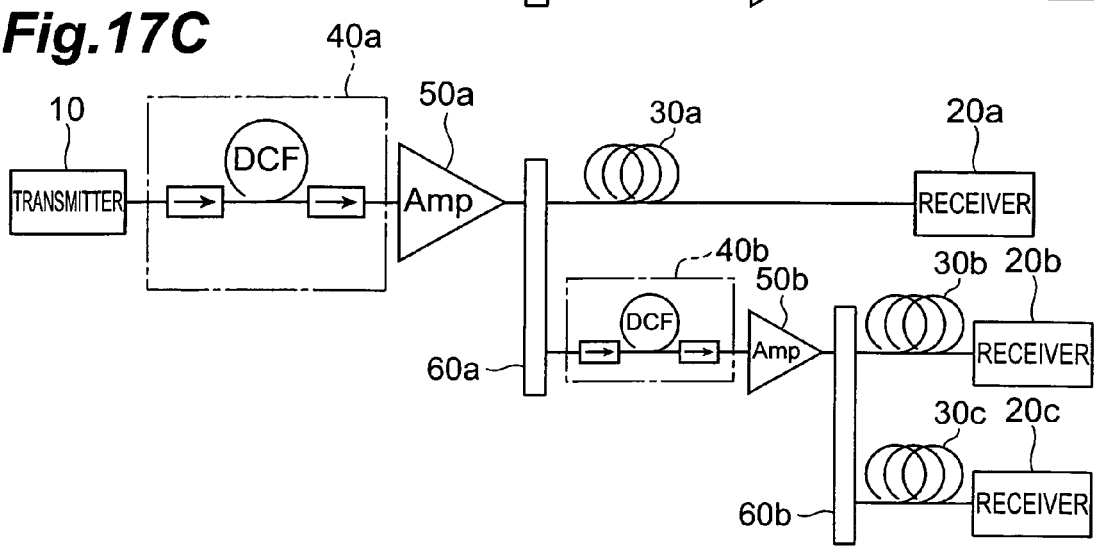

Next, a case where the transmission line is constructed by multiple branched transmission lines in which the transmission line 30 is constructed by using an optical branching device such as optical branching coupler will be described. FIGS. 17A to 17C are diagrams illustrating the construction of a fourth embodiment (multiple branched paths) of the analog optical transmission system according to the present invention.

The analog optical transmission system shown in FIG. 17A has the substantially same structure as that of the analog optical transmission system (FIG. 9) according to the second embodiment, and further having the following constructions: the transmission line is divided into three branched lines 30a to 30c through an optical coupler 60, and optical receivers 20a to 20c are connected to the branched lines 30a to 30c, respectively. In addition, the analog optical transmission system shown in FIG. 17B has multiple branched lines similar to that of the analog optical transmission system shown in FIG. 17A, and further the DCF is three-divided. For this reason, a dispersion compensating module 40a containing a first fiber element (DCF) of the three-divided branched lines is arranged immediately after an optical transmitter 10, a dispersion compensating module 40b containing a second fiber element (DCF) thereof is arranged on a second branched line 30b, and a dispersion compensating module 40c containing a third fiber element (DCF) thereof is arranged on a third branched line 30c. Additionally, in the analog optical transmission system shown in FIG. 17B, since the lengths of the branched lines are different from each other, a first optical amplifier 50a is arranged immediately before an optical branching coupler 60, and a second optical amplifier 50b is arranged on the third branched line 30c. Further, in the analog optical transmission system shown in FIG. 17C, in order to reduce the number of the dispersion compensating modules in the analog optical transmission system shown in FIG. 17B, the dispersion compensating module 40b and optical amplifier 50b which are commonly provided for the second and third branched lines 30b, 30c are arranged between a first optical branching coupler 60a and a second optical branching coupler 60b.

Incidentally, as regards the dispersion compensation, as shown in FIG. 4, since desired CSO characteristics is obtained when there is approximately ±5 km from the position of 100% dispersion compensation (approximately ±85 ps/nm/km converted into an accumulated dispersion value), in the analog optical transmission system shown in FIG. 17A, the lengths of the branched lines 30a to 30c each are a difference within ±5 km, it is unnecessary to carry out the dispersion compensation independently. However, since the accumulated dispersion as well as the loss on the transmission line are different for each branched line in an actual system, like the analog optical transmission system shown in FIG. 17B or FIG. 17C, it is required to compensate the amount of the dispersion to be required to compensate previously the smallest accumulated dispersion among the multiple branched transmission lines on the side of the transmitter 10; it is also required to implement the dispersion compensation for the rest thereof separately.

Furthermore, as a method for reducing the accumulated dispersion of the transmission line, as shown in FIGS. 18A to 18E, it is also considered to mix a zero-dispersion DSF at 1.55 μm and employ the NZ-DSF as well as the SMF in the transmission line. Specifically, by reducing the accumulated chromatic dispersion of the transmission line itself, it is assumed to reduce the amount of the dispersion to be compensated by the dispersion compensating module, thereby reducing the MPI noise on the whole transmission line. However, in the DSF for 1.55 μm or NZ-DSF, the ratio of the Rayleigh scattering to be generated in the transmission line as compared with the typical SMF is larger; in order to keep excellent transmission characteristics, it is desirable to make the fiber lengths of the DSF for 1.55 μm or NZ-DSF as short as possible. Additionally, FIGS. 18A to 18E are diagrams illustrating a variety of construction examples of the transmission line in the analog optical transmission system.

For example, when the NZ-DSF is applied thereto together with the SMF having a zero-dispersion at 1.3 μm, the NZ-DSF preferably has the chromatic dispersion whose absolute value is more than 1 but 1-ps/nm/km or less at a signal light wavelength. When the DSF is applied thereto together with the SMF, the DSF preferably has the chromatic dispersion whose absolute value is 0 ps/nm/km or more but 1 ps/nm/km or less at the signal light wavelength. In addition, the optical fiber having the chromatic dispersion of whose absolute value is 1 ps/nm/km or more but 16 ps/nm/km or less at the signal light wavelength and having an effective area of 20 μm² or more but 90 μm² or less at the signal light wavelength may be applied to the transmission line together with the SMF.

In addition, in order to reduce the Rayleigh scattering light to be generated in the transmission line, it is desirable to employ a fiber having a smaller Rayleigh scattering coefficient and having a larger effective area. In this case, it is preferable to employ in particular a fiber having a core of pure silica to the whole or its part in the transmission line. It is because the Rayleigh scattering coefficient is smaller since no impurity is present inside the core. Since the loss of the pure-silica-core fiber becomes smaller as compared with a normal $GeO_2$-core SMF, the effect of enlarging the loss budget also can be expected.

Additionally, in order to suppress the occurrence of the Rayleigh light in the transmission line, thereby reducing the MPI noise, the optical transmission line 30 preferably has the chromatic dispersion whose absolute value is 18 ps/nm/km or more but 30 ps/nm/km or less at the signal light wavelength and having an effective area $A_{\mathit{eff}}$ of 90 μm² or more but 220 μm² or less at the signal light wavelength.

As described above, when both the transmission line and DCF 400 are divided into a plurality of elements, the MPI noise defined by the equations (5a) and (5b) is rewritten as the following equation (9).

$$MPI_{X-K} = \left( \frac{\gamma_{X-K}}{2\alpha_{X-K}} (2\alpha_{X-K} L_{X-K} - 1 + e^{-2\alpha_{X-K} L_{X-K}})^{1/2} \right)^2 \quad (9)$$

In the equation, suffix X represents a type of optical fiber, while suffix K represents a divided element number. In addition, the conditions required in the system as shown in the equations (6) and (8) are rewritten as shown by the following equations (10a) and (10b), where the DCF is divided into i fiber elements, and the transmission line 30 (TL) is divided into j fiber elements.

$$\sum_i MPI_{DCF-i} + \sum_j MPI_{TL-j} \leq 10^{-6} \quad (10a)$$

$$\left| \sum_i \sigma_{DCF-i} L_{DCF-i} - \sum_j \sigma_{TL-j} L_{TL-j} \right| \leq \frac{10^{-3}}{nm \Delta \lambda f} \quad (10b)$$

Figure 18A:
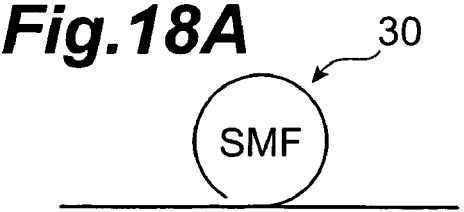
FIGS. 18A to 18E are diagrams illustrating a variety of construction examples of the transmission line in the analog optical transmission system.
Figure 18B:
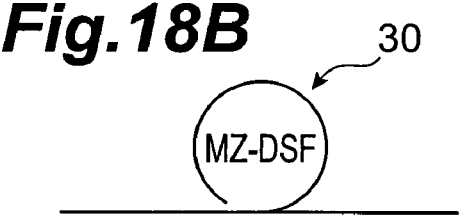
Figure 18C:
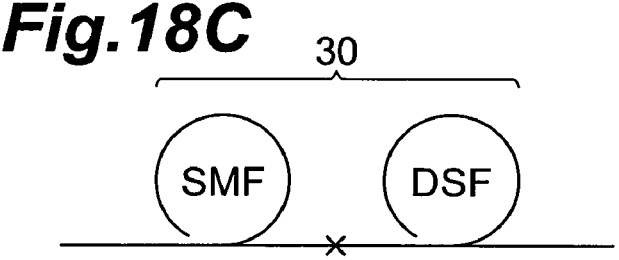
Figure 18D:
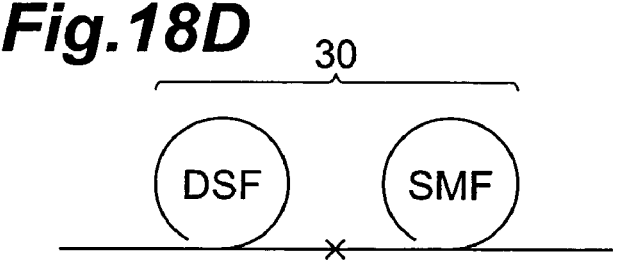
Figure 18E:
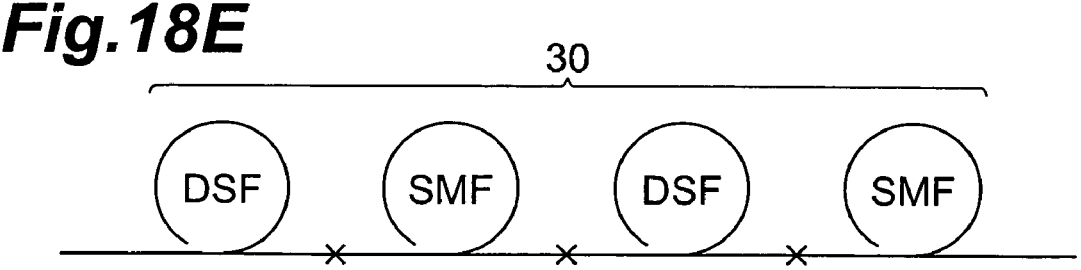
Figure 19A:
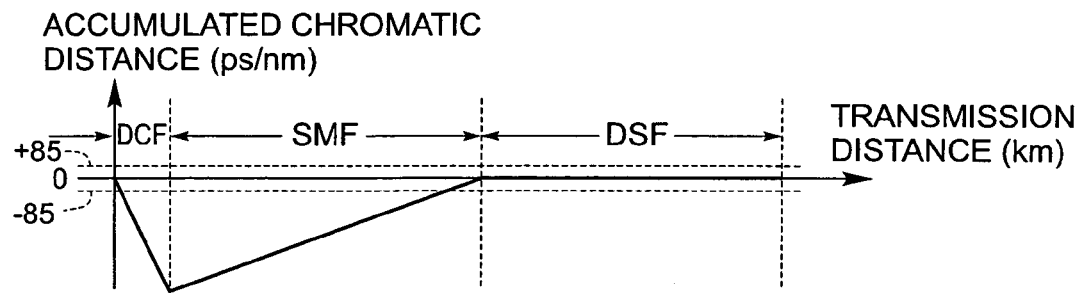
FIGS. 19A to 19C each are a view representing a change of the accumulated chromatic dispersion where the construction of any one of FIGS. 18C to 18E is applied as the transmission line with respect to the analog optical transmission system shown in FIG. 9.
Figure 19B:
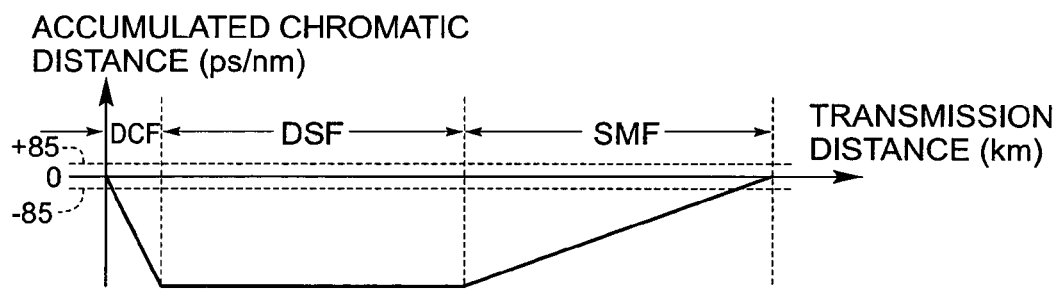
Figure 19C:
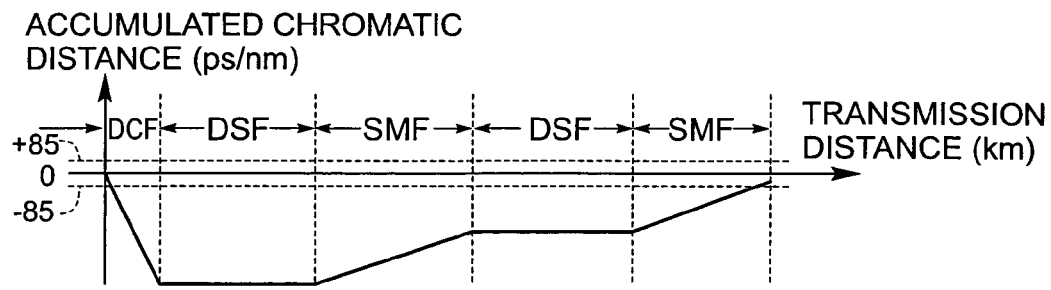
Figure 20:
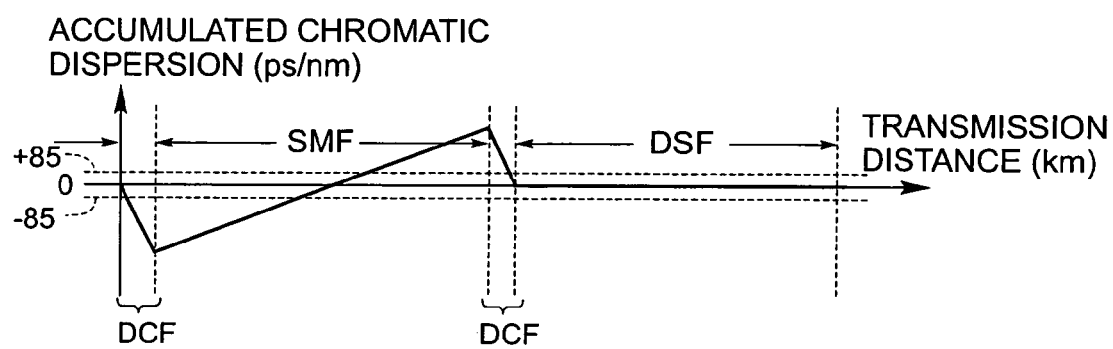
FIG. 20 is a view representing a change of the accumulated chromatic dispersion where the construction of FIG. 18C is applied as the transmission line with respect to the analog optical transmission system shown in FIG. 16B.
Figure 21A:
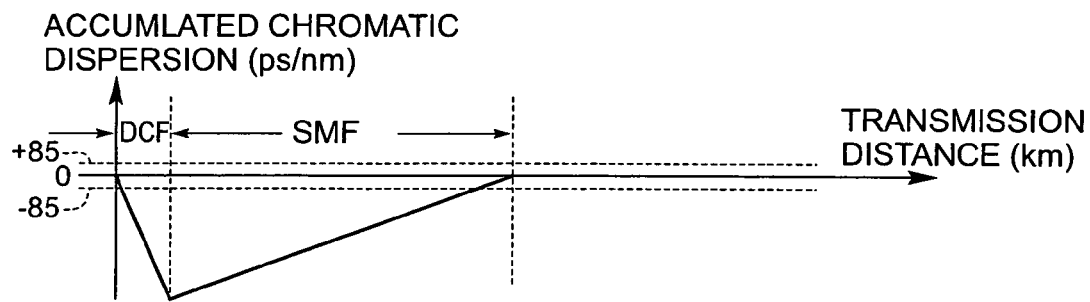
FIGS. 21A to 21C are views representing changes of the accumulated chromatic dispersion where the construction of FIG. 18A is applied as the first divided path 30a with respect to the analog optical transmission system in FIG. 17C (construction having no dispersion compensating module 40b and optical amplifier 50b in FIG. 17C), and where the construction of FIG. 18D is applied as the second and third divided paths 30b, 30c, respectively.
Figure 21B:
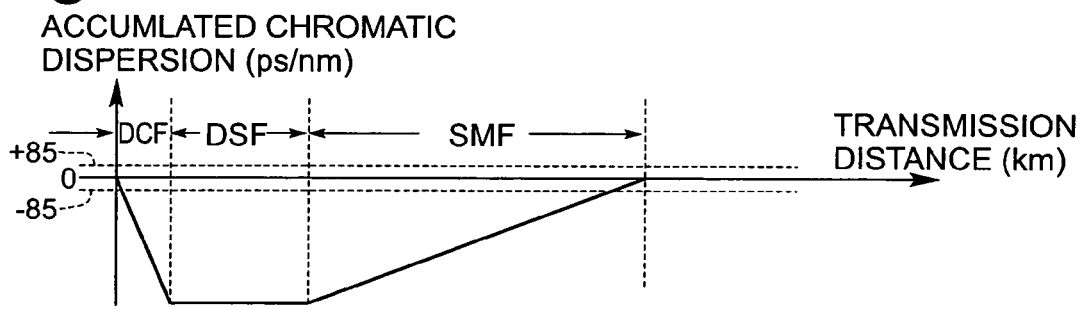
Figure 21C:
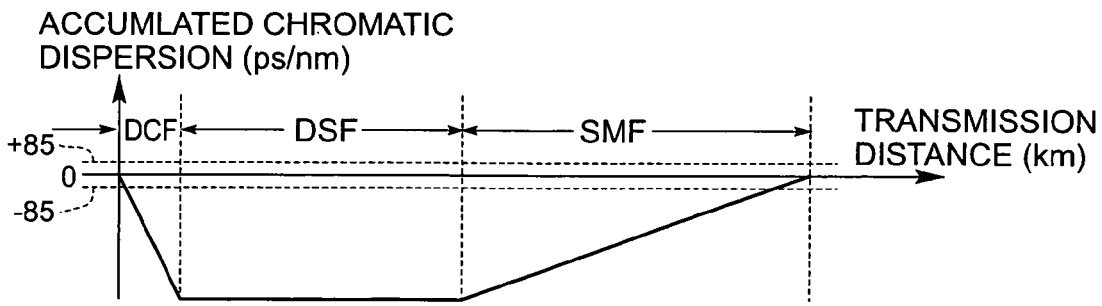
Figure 22:
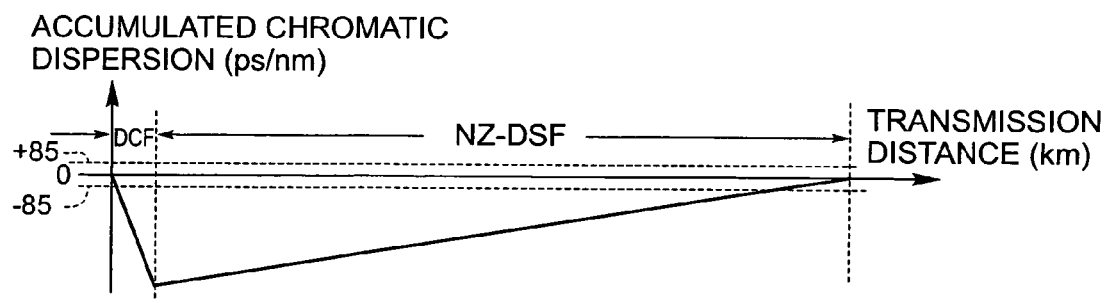
FIG. 22 is a view representing a change of the accumulated chromatic dispersion where the construction of FIG. 18B is applied as the transmission line with respect to the analog optical transmission system shown in FIG. 3.

Further, FIGS. 18A–19C, 20, 21A–21C and 22 are views representing changes of the accumulated chromatic dispersion in the analog optical transmission systems having the aforementioned various constructions. That is, FIG. 18A is a view representing a change of the accumulated chromatic dispersion where the construction of FIG. 18C is applied as the transmission line 30 with respect to the analog optical transmission system shown in FIG. 9. FIG. 19B is a view representing a change of the accumulated chromatic dispersion where the construction of FIG. 18D is applied as the transmission line 30 with respect to the analog optical transmission system shown in FIG. 9. FIG. 19C is a view representing a change of the accumulated chromatic dispersion where the construction of FIG. 18E is applied as the transmission line 30 with respect to the analog optical transmission system shown in FIG. 9. FIG. 20 is a view representing a change of the accumulated chromatic dispersion where the construction of FIG. 18C is applied as the transmission line 30 with respect to the analog optical transmission system shown in FIG. 16B. FIGS. 21A to 21C are views representing changes of the accumulated chromatic dispersion where the construction of FIG. 18A is applied as the first divided path 30a with respect to the analog optical transmission system analogous in FIG. 17C (construction having no dispersion compensating module 40b and optical amplifier 50b in FIG. 17C), and where the construction of FIG. 18D is applied as the second and third divided paths 30b, 30c, respectively. Further, FIG. 22 is a view representing a change of the accumulated chromatic dispersion where the construction of FIG. 18B is applied as the transmission line with respect to the analog optical transmission system shown in FIG. 3.

FIG. 23 is a view illustrating the construction of a fifth embodiment in the analog optical transmission system according to the present invention. The analog optical transmission system according to the fifth embodiment has a construction similar to that of the analog optical transmission system according to the second embodiment (FIG. 9); however, there is a difference in that an optical attenuator 70 is arranged between the optical transmitter 10 and dispersion compensating module 40 as a structure for reducing non-linearity in the DCF or the dispersion compensating module containing the DCF.

In general, when light of high-output propagates in a DCF 400, a phase shift occurs due to self phase modulation, which may cause any distortion in a signal light. This can be avoided when the fixed or variable optical attenuator 70 is arranged on the side of the incidence end of the dispersion compensating module 40.

In addition, it may also be considered to cause a stimulated Brillouin scattering when the spectral line width of the optical signal is narrow. This can also be avoided by reducing the signal power which is incident on the DCF 400. If the loss of the whole system and its receiving sensitivity also is lowered increases because the optical attenuator 70 is arranged, optical amplifier and so on may be arranged in place.

Figure 24A:
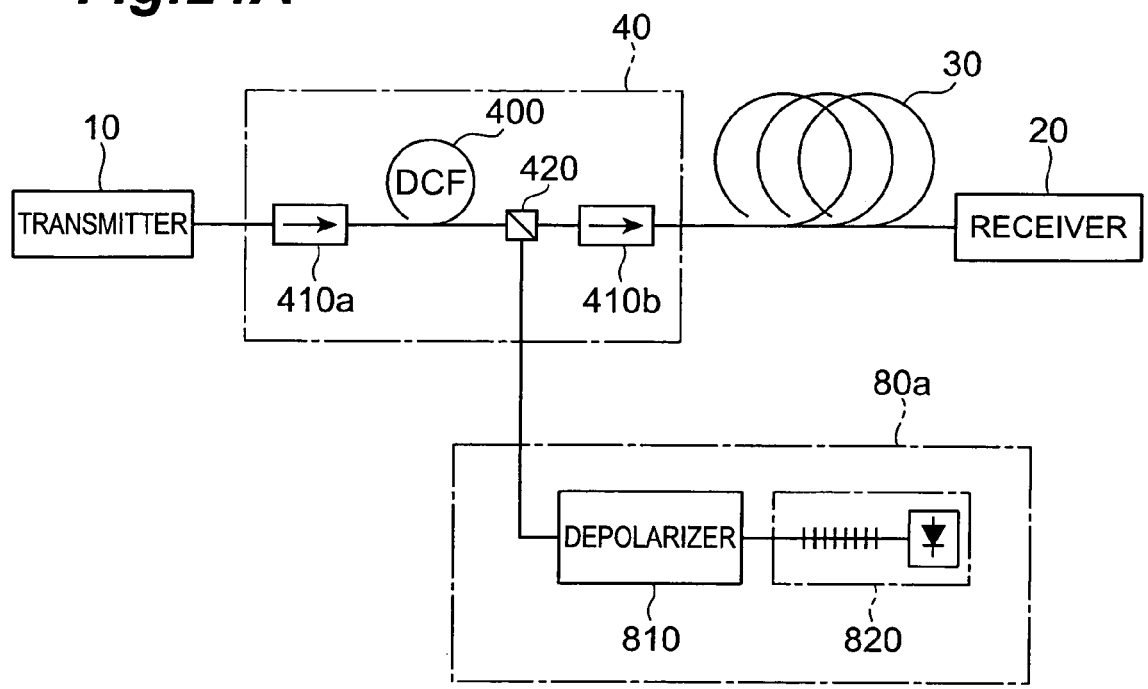
FIGS. 24A and 24B show the construction of a sixth embodiment of the analog optical transmission system according to the present the invention.
Figure 24B:
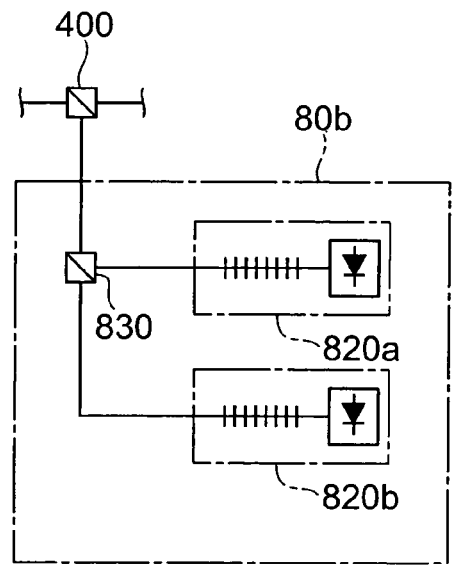

FIGS. 24A and 24B are diagrams illustrating the construction of a sixth embodiment of the analog optical transmission system according to the present invention. The analog optical transmission system according to the sixth embodiment has a construction which enables a loss-less dispersion compensating module due to the Raman amplification.

Thus, the analog optical transmission system according to the sixth embodiment has a construction similar to the analog optical transmission system according to the first embodiment; however, there is a difference in that a pumping light source is further provided to utilize the DCF 400 in the dispersion compensating module 40 as a Raman amplification medium. In particular, as shown in FIG. 24A, a wavelength synthesizing device 420 (WDM coupler) for guiding pumping light within the DCF 400 is arranged between ISOs 410a and 410b. The pumping light source 80a in FIG. 24A is constructed by one fiber grating laser 820 (FGL) and a depolarizing device 810 (depolarizer) for reducing the polarization dependence gain of the Raman amplifier. As mentioned above, it is required to bring an emitted pumping light in a depolarizing state in the case of the pumping light source 80a having only the single FGL.

In addition, in the analog optical transmission system according to the six embodiment, the pumping light source for carrying out the Raman amplification may be a construction having a plurality of light sources. For example, as shown in FIG. 24B, the pumping light source 80b is constructed by two FGLs and a polarization multiplexer 830. When the tow FGLs are employed like the pumping light source 80b, the PDG can be reduced by using the polarization multiplexer 830.

The analog optical transmission system according to the present invention is applicable to an optical communication system which provides a FTTH service led to a subscriber's home from an end station of an existing network to an optical fiber.

In accordance with the present invention, when a dispersion compensating fiber for compensating the chromatic dispersion of a transmission line is appropriately selected, a transmittable distance can be greatly expanded in an analog optical transmission system using a low-cost directly modulated laser diode (DML).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An analog optical transmission system comprising:
   an optical transmitter outputting optical signals modulated in accordance with electrical signals multiplexed on a frequency domain;
   a transmission line through which the modulated optical signals propagate, said transmission line having a whole length of 20 km or less and including a single mode fiber;
   an optical receiver receiving light that has propagated through said transmission line;
   a dispersion compensating fiber compensating for a chromatic dispersion of said transmission line, said dispersion compensating fiber satisfying one of a first condition that a chromatic dispersion is set at −250 ps/nm/km or less and a length is set at 1.1 km or less, and a second condition that the chromatic dispersion is set at −330 ps/nm/km or less and a length is set at 1.2 km or less; and
   an optical suppressing device suppressing light that propagates in a reverse direction to a propagating direction of the optical signal, said optical suppressing device arranged in a state adjacent to at least one of a light incidence end side and a light emission end side of said dispersion compensating fiber.

2. An analog optical transmission system according to claim 1, wherein said dispersion compensating fiber has a Rayleigh scattering coefficient less than $1.5 \times 10^{-7}$ (1/m).

3. An analog optical transmission system comprising:
   an optical transmitter outputting optical signals modulated in accordance with electrical signals multiplexed on a frequency domain;
   a transmission line through which the modulated optical signals propagate;
   an optical receiver receiving light that has propagated through said transmission line;

a dispersion compensating fiber compensating for a chromatic dispersion of said transmission line; and an optical suppressing device suppressing light that propagates in a reverse direction to a propagating direction of the optical signals, said optical suppressing device arranged in a state adjacent to at least one of a light incidence end side and a light emission end side of said dispersion compensating fiber, wherein a length L of said dispersion compensating fiber is set to be longer than $L_{CSO1}$ but shorter than $L_{CSO2}$ when $L_{CSO1} < L_{MPI}$, and further is set to be longer than $L_{CSO1}$ but shorter than $L_{MPI}$ when $L_{CSO1} < L_{MPI} < L_{CSO2}$, where a length required for said dispersion compensating fiber such that MPI noise is allowable on system design is provided as $L_{MPI}$, and lower-limit and upper-limit lengths required for said dispersion compensating fiber such that CSO is allowable on system design are respectively provided as $L_{CSO1}$ and $L_{CSO2}$.

4. An analog optical transmission system comprising:

an optical transmitter outputting optical signals modulated in accordance with electrical signals multiplexed on a frequency domain;

a transmission line through which the modulated optical signals propagate;

an optical receiver receiving light that has propagated through said transmission line;

a dispersion compensating fiber compensating for a chromatic dispersion of said transmission line, said dispersion compensating fiber having a length L; and a first optical suppressing device suppressing light that propagates in a reverse direction to a propagating direction of the optical signals, said first optical suppressing device arranged in a state adjacent to at least one of a light incidence end side and a light emission end side of said dispersion compensating fiber, wherein $L_{MPI}$ is shorter than $L_{CSO1}$, and the length L of said dispersion compensating fiber is set to be longer than $L_{CSO1}$ but shorter than $L_{CSO2}$, where a length required for said dispersion compensating fiber such that MPI noise is allowable on system design is provided as $L_{MPI}$, and lower-limit and upper-limit lengths required for said dispersion compensating fiber such that CSO is allowable on system design are respectively provided as $L_{CSO1}$ and $L_{CSO2}$, and wherein said dispersion compensating fiber is divided into a plurality of fiber elements, and said analog optical transmission system further comprises a second optical suppressing device arranged between said plurality of fiber elements, said second optical suppressing device suppressing the light that propagates in the reverse direction to the propagating direction of the optical signals.

5. An analog optical transmission system comprising:

an optical transmitter outputting optical signals modulated in accordance with electrical signals multiplexed on a frequency domain;

a transmission line through which the modulated optical signals;

an optical receiver receiving light that has propagated through said transmission line; and a group of modules including a plurality of dispersion compensating modules each having a dispersion compensating fiber compensating for a chromatic dispersion of said transmission line, a light suppressing device suppressing light that propagates in a reverse direction to a propagating direction of the optical signals, and a connecting terminal connecting directly or indirectly said module itself to said transmission line, wherein each dispersion compensating module of said group of modules is selected so that $\Sigma MPI_i$ is smaller than $MPI_{DCF}$ and that $\Sigma D_i$ is larger than $D_1$ but smaller than $D_2$, where MPI required for said group of modules such that MPI noise is allowable on system design is provided as $MPI_{DCF}$, lower-limit and upper-limit values of the chromatic dispersion (ps/nm) required for said group of modules such that CSO is allowable on system design are respectively provided as $D_1$ and $D_2$, and the sums of the MPI and chromatic dispersion (ps/nm) of each of said plurality of dispersion compensating modules are respectively provided as $\Sigma MPI_i$ and $\Sigma D_i$.

6. An analog optical transmission system according to claim 5, wherein said connecting terminal includes an optical connector.

7. An analog optical transmission system according to claim 1, further comprising an optical amplifier arranged at a predetermined position on said transmission line.

8. An analog optical transmission system according to claim 7, wherein said optical amplifier has a gain slope of 0.2 dB/nm or less at a signal light wavelength.

9. An analog optical transmission system according to claim 7, wherein said optical amplifier includes a rare earth doped optical fiber amplifier.

10. An analog optical transmission system according to claim 9, further comprising a flattening device flattening a gain shape of said rare earth doped optical fiber amplifier, said flattening device arranged at a predetermined position on said transmission line.

11. An analog optical transmission system according to claim 7, wherein said optical amplifier includes a distributed Raman amplifier.

12. An analog optical transmission system according to claim 7, wherein said optical amplifier includes a lumped Raman amplifier.

13. An analog optical transmission system according to claim 7, wherein said optical amplifier includes a semiconductor optical. amplifier.

14. An analog optical transmission system according to claim 1, further including an optical branching device branching an optical signal going from said optical transmitter to said optical receiver into a plurality of paths, said optical branching device arranged on the path of the transmission line.

15. An analog optical transmission system according to claim 14, wherein a plurality of dispersion compensating modules are arranged on said optical transmission path, and among these plurality of dispersion compensating modules, the dispersion compensating module compensating for the branched path having the smallest accumulated chromatic dispersion among the branched paths constituting a multiple branched optical transmission line including said optical branching device as a transmission path is arranged immediately after said optical transmitter.

16. An analog optical transmission system according to claim 1, wherein said transmission line is constructed in a state where a normal single-mode fiber having a zero-dispersion wavelength of 1.3 μm and a different-type of optical fiber different from said single-mode fiber are mixed.

17. An analog optical transmission system according to claim 16, wherein said different-type of optical fiber has a chromatic dispersion whose absolute value is more than 1 ps/nm/km but 10 ps/nm/km or less at a signal light wavelength.

18. An analog optical transmission system according to claim 16, wherein said different-type of optical fiber has a chromatic dispersion whose absolute value is 1 ps/nm/km or less at a signal light wavelength.

19. An analog optical transmission system according to claim 1, wherein said transmission line includes an optical fiber having a chromatic dispersion whose absolute value is 10 ps/nm/km or less at a signal light wavelength.

20. An analog optical transmission system according to claim 1, wherein said transmission line includes an optical fiber having a core made of pure silica.

21. An analog optical transmission system according to claim 1, wherein said transmission line includes an optical fiber having a chromatic dispersion whose absolute value is 18 ps/nm/km or more at a signal light wavelength, and an effective area of 90 $\mu m^2$ or more at the signal light wavelength.

22. An analog optical transmission system according to claim 21, wherein said optical fiber is one having a core made of pure silica.

23. An analog optical transmission system according to claim 1, wherein said transmission line includes an optical fiber having a chromatic dispersion whose absolute value is 16 ps/nm/km or less at a signal light wavelength, and an effective area of 90 $\mu m^2$ or less at the signal light wavelength.

24. An analog optical transmission system according to claim 23, wherein said optical fiber is one having a core made of pure silica.

25. An analog optical transmission system according to claim 1, further comprising an optical attenuator arranged on the upper stream side of said dispersion compensating fiber.

26. An analog optical transmission system according to claim 1, further comprising a pumping light source outputting a pumping light having a predetermined wavelength to carry out a Raman amplification in said dispersion compensating fiber, and an optical multiplexer guiding the pumping light from said pumping light source to said dispersion compensating fiber.

* * * * *